United States Patent
Dodge

(10) Patent No.: US 9,762,971 B1
(45) Date of Patent: Sep. 12, 2017

(54) TECHNIQUES FOR PROVIDING MEDIA CONTENT BROWSING

(71) Applicant: Amazon Technologies, Inc., Seattle, WA (US)

(72) Inventor: Michael L S Dodge, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/139,266

(22) Filed: Apr. 26, 2016

(51) Int. Cl.
| | | |
|---|---|---|
| *G06F 3/00* | (2006.01) | |
| *G06F 13/00* | (2006.01) | |
| *H04N 5/445* | (2011.01) | |
| *H04N 21/482* | (2011.01) | |
| *H04L 29/08* | (2006.01) | |
| *H04N 21/45* | (2011.01) | |
| *H04N 21/472* | (2011.01) | |
| *H04N 21/8549* | (2011.01) | |
| *H04N 21/466* | (2011.01) | |
| *G11B 27/031* | (2006.01) | |

(52) U.S. Cl.
CPC ....... *H04N 21/4826* (2013.01); *G11B 27/031* (2013.01); *H04L 67/02* (2013.01); *H04N 21/4532* (2013.01); *H04N 21/4663* (2013.01); *H04N 21/4667* (2013.01); *H04N 21/4668* (2013.01); *H04N 21/47202* (2013.01); *H04N 21/8549* (2013.01)

(58) Field of Classification Search
None
See application file for complete search history.

(56) References Cited

U.S. PATENT DOCUMENTS

| | | | | |
|---|---|---|---|---|
| 7,082,255 B1* | 7/2006 | Jun | .................... | G06F 17/30793 348/E7.071 |
| 2011/0153663 A1* | 6/2011 | Koren | ............... | G06F 17/30964 707/776 |
| 2013/0343727 A1* | 12/2013 | Rav-Acha | ............ | G11B 27/031 386/282 |
| 2014/0219629 A1* | 8/2014 | McIntosh | ............. | G11B 27/105 386/241 |
| 2015/0172748 A1* | 6/2015 | Navarro | ............. | H04N 5/44543 725/41 |
| 2015/0281764 A1* | 10/2015 | Stathacopoulos | .. | H04N 21/4316 725/41 |

* cited by examiner

*Primary Examiner* — William J Kim
(74) *Attorney, Agent, or Firm* — Kilpatrick Townsend & Stockton LLP

(57) ABSTRACT

Techniques are provided herein for generating and providing micro-previews of edited versions (e.g., a movie trailer) associated with media content. In accordance with at least one embodiment, a plurality of edited content (e.g., movie trailers) corresponding to a collection of motion pictures may be obtained, the collection of motion pictures being related by a collection category. A plurality of respective play durations for respective items of the plurality of edited content may be determined. A plurality of respective start times for the respective items of the plurality of edited content may be determined. At least a subset of the plurality of edited content may be played (e.g., consecutively) based at least in part on the plurality of respective start times and the plurality of respective play durations for the respective items of the collection of motion pictures.

33 Claims, 14 Drawing Sheets

TECHNIQUES FOR PROVIDING MEDIA CONTENT BROWSING

BACKGROUND

It has become commonplace for consumers to browse media content libraries (e.g., movie libraries) in order to find new content (e.g., a movie) they may wish to order. Electronic marketplaces provide an abundance of media content. However, finding content can be a slow process. Current techniques allow a user to view a "preview" or "trailer" of a movie in order to assess his or her interest. Finding a movie of interest utilizing these techniques can be time consuming to the user as each preview is approximately two minutes long. As a result, the user may waste large amounts of time simply viewing previews that may, or may not, lead to a successful search. Additionally, current techniques for viewing numerous movie previews require many user interactions that can be cumbersome and annoying to the user. The amount of friction experienced by the user while browsing for a movie can cause the user to become frustrated and abandon his search for a movie, further leading to decreased revenues for the media content provider.

BRIEF DESCRIPTION OF THE DRAWINGS

Various embodiments in accordance with the present disclosure will be described with reference to the drawings, in which.

DETAILED DESCRIPTION

Figure 1:
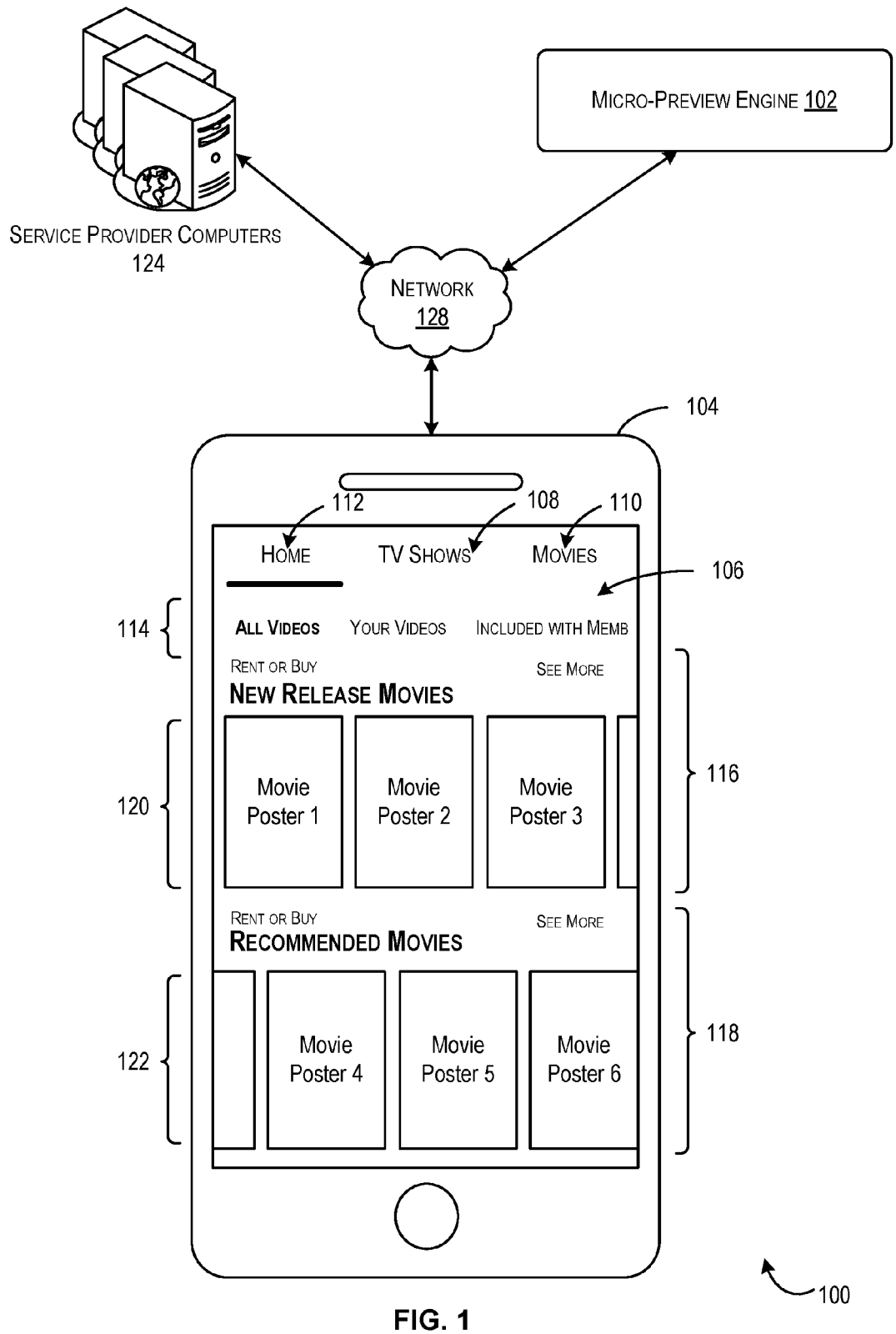
FIG. 1 is a schematic diagram illustrating an example environment suitable for implementing aspects of a micro-preview engine, in accordance with at least one embodiment.

Techniques described herein are directed to playing one or more media content items utilizing a micro-preview engine. A "media content item" may include an edited version (e.g., a preview or trailer) of media content (e.g., a movie, an audiobook, a song) that electronically depict a shorter version of the media content, the edited version being different from the original media content. Although examples throughout may utilize movies for illustrative purposes, it should be appreciated that any example herein may be equally applied to other suitable types of media.

In accordance with at least one embodiment, the micro-preview engine may, in response to a user request, provide a micro-preview of the edited version of media content. In the context of a movie, the micro-preview engine may retrieve a trailer from a media content library, the trailer being associated with a particular movie. A start time and a duration may be determined by the micro-preview in order to provide a shortened, customized version of the trailer (e.g., a micro-preview). In some examples, the micro-preview engine may determine a start time from a predetermined value (e.g., 0.75). The predetermined value may be multiplied by the total length of the trailer in order to calculate a start time. In other examples, the micro-preview engine may determine a start time based on information known about the user (e.g., order information, navigation information, user preference information, wish list information, etc.) and attributes associated with the movie (e.g., a genre category, a director, an actor, a producer, a release date, or the like). Order information for the user may include information related to purchases, rentals, exchanges, or the like. Navigation information may include interface selections (e.g., skipping a trailer, requesting more information about the movie, etc.) User preference information may include information submitted by the user related to a reason that the user modified micro-preview playback and/or explicit explanations related to the user's interest in a particular movie.

As a non-limiting example, the micro-preview engine may determine that the user often orders movies of a particular genre (e.g., romantic comedies). Accordingly, the micro-preview engine may adjust, or otherwise calculate, a start time for movies of that genre to be earlier than movies that the user rarely orders (e.g., horror movies). Similarly, the micro-preview may determine a duration for the micro-preview from a predetermined value (e.g., 8 seconds or another suitable time period) and/or the micro-preview engine may adjust, or otherwise calculate, a duration based on user information and attributes associated with the movie. Thus, movies that are similar to those that the user has shown interest to in the past (e.g., movies like one that the user has ordered, movies like ones that the user has requested more information, movies that the user has added to a wish list to be stored for later reference, or the like) may be provided earlier start times and/or longer durations than movies that are determined to be of little interest to the user.

In accordance with at least one embodiment, a user may view an electronic media content library using, for example, a browsing application (e.g., a web browser) and/or an application operating on a user device. The electronic media content library may be provided by an electronic marketplace or other service provider. In some examples, an "electronic marketplace" may include a computer-facilitated market for participants (e.g., buyers and sellers) to conduct transactions including commercial and/or financial transactions including the ordering, purchasing, leasing, and/or borrowing of one or more media content items. In at least one example, the user may browse a media content library for a media item of interest (e.g., a motion picture (also known as a "movie), an audiobook, a musical composition, or other electronic works that are provided for consumption). The user may be presented with a number of media categories from which to make selections (e.g., in the context of movies, categories such as "new releases," "recommended movies," "comedies," "wish list movies," or the like).

As a non-limiting example, the user may select, via an interface provided by the micro-preview engine, a "new release" category corresponding to a collection of movies that have each been recently released to the public. The micro-preview engine may further provide interface options to enable the user to select a "quick preview" option in order to view micro-previews of the movies included in the selected category. In at least some examples, a "preview" in a motion picture context may also be referred to as a "trailer." Upon selection, the micro-preview engine may provide a micro-preview (e.g., shortened, customized trailers) of the original movie trailers in order to more quickly assess his interest. For example, a new release collection may include five movies that have each been released in the last two weeks. Upon selecting the "quick preview" option, the micro-preview engine may provide micro-previews for each movie that each last eight seconds (or other configurable length of time) in order to enable the user to view the collection in approximately forty seconds rather than the approximately ten minutes it would have originally taken the user to view all of the original trailers (assuming each original trailer was approximately two minutes long). It should be appreciated that each micro-preview may be started at different times, corresponding to a different respective portions of the way through the respective trailer. Further, each micro-preview may be played for the same, or different durations.

In at least one embodiment, the micro-preview engine may provide the trailers starting at some portion (e.g., 75%) through the original preview. Trailers typically follow a similar production arc where the vast amount of the climactic scenes occur within the last quarter of the trailer. By beginning playback near this portion in the original preview, the micro-preview engine enables the user to view the most climactic content without having to watch the less climactic scenes to be presented first. Additionally, by providing the user only a portion of the trailer, the micro-preview engine enables the service provider to save on streaming resources as potentially only a portion of the preview may be streamed to the user rather than the entire trailer.

In at least one embodiment, the micro-preview engine may provide an additional interface options that enable a user to "pivot" on an attribute of a movie. In a non-limiting example, the micro-preview engine may enable a user to view information associated with a movie (e.g., the movie associated with the preview currently being viewed). The user may, for example, swipe down on a touch screen of the user device to indicate that he wishes to view additional information for the movie. The micro-preview engine, upon receiving such input, may cause the user to be presented with a set of attributes associated with the movie. The attributes may include a director, one or more actors, one or more producers, a genre category, a release date, a professional critic review, a consumer review, a professional critic rating, a consumer rating, or any suitable information related to the movie. In at least one example, the micro-preview engine may provide interface elements that enable the user to select one or more attributes in order to "pivot" on the selected attributes. Upon receipt of these selections, the micro-preview engine may provide a new collection of movies that include the attributes selected.

As a non-limiting example, a user may be viewing movie information related to a movie starring a particular actor (e.g., Actor 1). The user may perform an action (e.g., touch and hold on a touch device) to be presented with an option to view movies that also star the particular actor. Upon selecting the option, the micro-preview engine may execute a query to determine a collection of movies that match the user's selection. The micro-preview engine may provide the collection of movies to the user for viewing. In some examples, the micro-preview engine may automatically begin providing edited versions of the movie previews for the new collection of movies. In this manner, the user is provided a useful tool for browsing media content based on one or more attributes of a movie.

The techniques disclosed herein address, at least, an internet-centric challenge of providing media content from an electronic marketplace to a user device while minimizing friction for the user. The techniques described herein enable the electronic marketplace provider to provide a more enjoyable browsing experience for the user while simultaneously saving on computational resources.

FIG. 1 is a schematic diagram illustrating an example environment 100 suitable for implementing aspects of a micro-preview engine 102, in accordance with at least one embodiment. For example, a user may utilize a user device 104 to browse for media content via an interface 106, for example. In at least one embodiment, a user may utilize a browsing application operating on the user device 104 to view television (TV) shows, movies, music, or any suitable media content. The browsing application may present the interface 106 as depicted in FIG. 1. Using the interface 106, the user may browse TV shows via a menu option 108 and movies via a menu option 110. The user may additionally, or alternatively, utilize a home screen utilizing a menu option 112. Upon selecting the menu option 112, the user may be presented with additional options such as menu options 114 (e.g., "all videos," "your videos," "included with membership," etc.). In at least one example, the menu options 114 may correspond to a collection of media content (e.g., an entire library, a user-defined collection, a collection sharing a common trait, etc.). It should be appreciated that any configuration of one or more options may be utilized in lieu of, or in addition to, the menu options 114.

In accordance with at least one embodiment, the micro-preview engine may provide the interface 106 to enable the user to enter various selections related to one or more media content collections. For example, selection of the "all videos" option of the menu options 114 may display one or more collections, such as a "new release movies" collection 116, and a "recommended movies" collection 118. In some examples, one or more movie posters may be displayed for each collection as is depicted in FIG. 1 by movie posters 120 and movie posters 122. The user may navigate through the movie posters 120 and/or the movie posters 122 to view the movie posters for movies included in the "new release movies" collection 116 and/or the "recommended movies" collection 118. In some examples, the user may utilize a "swiping" gesture on the user device 104 if the user device 104 is touch-enabled. In at least one embodiment, the user may select a point within the movie posters 120 and drag the posters to the left or right of the screen to navigate through the collection of movie posters. In at least one embodiment, the user may select a particular movie to navigate to a details page associated with a motion picture, the details page providing further information related to the motion picture (e.g., ratings, plot descriptions, reviews, actor information, director information, producer information, release date, etc.). In at least one embodiment, the user may select (e.g., by mouse click or touch, for example) a movie picture and hold the selection for a threshold number of seconds (e.g., 1 second) in order to indicate that the user wishes to view a quick preview of the selected movie poster. Upon receiving indication of such a selection, the micro-preview engine may determine a start time and a duration for a micro-preview of the selected movie. The micro-preview engine may then cause the micro-preview to be presented to the user according to the determined start time and duration.

Utilizing preview information obtained from the service provider computers 124 or from a data store suitable for storing previews and related information, the micro-preview engine 102 may determine a customized version of a preview (e.g., a trailer) to present to the user. In some examples, the micro-preview engine 102 may determine a start time and a duration (and/or end time) corresponding to a portion of the edited content. For example, the micro-preview engine 102 may request information regarding the preview from the service provider computers 124 and/or a data store suitable for storing one or more previews. Upon receipt of the preview information, the micro-preview engine 102 may determine the total time needed to show an entire preview. The micro-preview engine 102 may further determine a particular start time that corresponds to a portion (e.g., 75%, 85%, etc.) of the way through the preview. In some examples, the micro-preview engine 102 may cause the preview to be presented to the user starting at the determined start time. In still further examples, the micro-preview engine 102 may cause the preview to be provided to the user for a particular duration (e.g., 8 seconds, 10 seconds, 1 minute, or any suitable time period) or until the end of the original preview. In at least one example, the micro-preview engine 102 may buffer only the portion of the preview that can be identified using the start time, end time, duration, or the like.

In at least one example, a service provider implemented or provided by one or more service provider computers 124. The service provider computers 124 may host one or more network pages associated with an electronic marketplace operated by an electronic marketplace provider. For example, the service provider computers 124 may host network pages that provide the interface 106. Additionally, the service provider computers 124 may store the media content associated with the media provided for selection via the interface 106, or the media content may be stored in a data store configured for that purpose. In at least one example, the service provider computers 124 may manage media rights information associated with the user and previously purchased, borrowed, and/or rented media content. In some examples, the service provider computers 124 may store such media rights information as part of a user profile associated with the user. Although movies are used in the example depicted in FIG. 1, it should be appreciated that any media library of any suitable media content may be utilized. The user may navigate, via the application executing on the user device 104, or via another application executing on the user device 104 or another user device, to the one or more network pages hosted by the service provider computers 124. Upon selection of graphical element 126 of the "new release movies" collection 116), the user may complete a transaction to order (e.g., purchase, lease, borrow, exchange, etc.) the movie associated with the graphical element 126.

In at least one embodiment, the micro-preview engine 102 may communicate with the service provider computers 124 and the user device 104 via network 128 in order to provide micro-previews for media contained in the media library hosted by the service provider computers 124. In media content such as musical albums, "edited content" may include a sample of an album that includes portions of various songs included in the album. Edited content in a movie context may include an edited version of the movie (e.g., a trailer) in which portions of the movie appear but not necessarily in the same order as the portions appear in the movie. A "micro-preview" refers to a shortened, or otherwise customized, version of the edited content, regardless of context. Network 128, and any network described herein, can include any appropriate network, including an intranet, the Internet, a cellular network, a local area network, a wide area network, or any other such network or combination thereof. The order information may include a user identifier and playback rights associated with the audio composition (e.g., unlimited playback rights, playback rights associated with a particular time period, etc.).

In at least one example, the micro-preview engine 102 may utilize machine learning techniques to analyze order history information managed by the service provider computers 124 and associated with a user. "Machine learning techniques," as included herein, are intended to include, but are not limited to, supervised learning, unsupervised learning, and/or semi-supervised learning. In supervised learning, a statistical model is prepared through a training process where it is required to make predictions (e.g., predicting when a user may order a movie) and is corrected when those predictions are incorrect (e.g., the user did not order the movie). The training process may continue until the model achieves a desired level of accuracy on the training data (e.g., over a threshold value such as 0.90 or 90%). Supervised machine learning techniques are often used to solve classification and regression problems. Example supervised machine learning algorithms include logistic regression and neural networks. In unsupervised learning, a model is prepared by deducing structures present in the input data. This may be accomplished, for example, by extracting general rules, or by utilizing a mathematical process of systematically reducing redundancy, or by organizing data by similarity. Unsupervised machine learning techniques are often used to solve problems associated with clustering, dimensionality reduction, and association rule learning. Example unsupervised machine learning algorithms include the Apriori algorithm and K-means algorithms. In semi-supervised learning, input data includes a mixture of labelled and unlabeled example. The model must learn the structures to organize the data as well as make predictions. Semi-supervised machine learning techniques are often used to solve classification and regression problems.

In some examples, the micro-preview engine 102 may determine what portions of previews to provide to a particular user. As a non-limiting example, a user may regularly order romantic comedies (e.g., over a threshold number of times) but may have never ordered a horror film (or have ordered a horror film under a threshold number of times). Accordingly, the micro-preview engine 102 may determine that such a user will be presented a longer preview (e.g., 10 seconds of the original preview) for romantic comedy movies than for horror movie previews (e.g., only 3 seconds worth of the original preview, or none at all). In other examples, machine learning techniques may be utilized to determine that the user is likely (e.g., over 0.95 certainty, over 0.90, etc.) to order a particular movie associated with a preview. Accordingly, the micro-preview engine 102 may utilize such information to determine that the user will be presented a longer preview (e.g., 20 seconds) for the movie than previews for movies that are less likely to be ordered.

Because only portions of each preview are presented, the user may navigate through many previews in a fraction of the time it would take him to preview each individual preview in its entirety. Additionally, the micro-preview engine provides the user with the ability to view the preview starting at a portion of the way through the original preview. Because previews typically follow a standard story-line arc, many of the climatic portions of the preview may fall within a particular portion of the original preview (e.g., 70% of the way through the original preview through the end of the original preview). Thus, the user may be able to view the most-relevant portions of the preview so that he may more quickly ascertain his interest in the movie. Given that typical previews are approximately two minutes long, a user may view many more previews in the same span of time (e.g., around 7.5 micro-previews for a single preview assuming an eight second viewing time for the micro-preview) while still being able to understand the respective plot lines.

Figure 2:
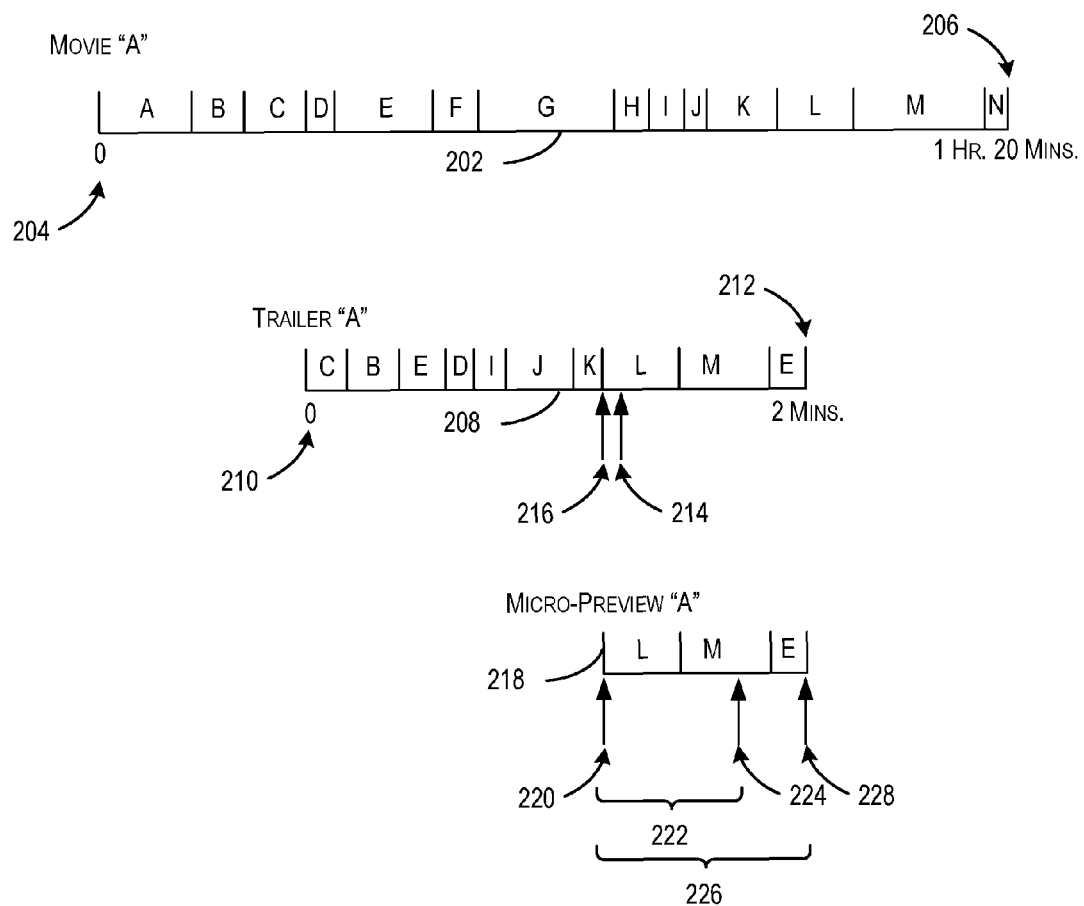
FIG. 2 is a schematic diagram illustrating relationships between original media content, an edited version of the media content, and a micro-preview, in accordance with at least one embodiment.

FIG. 2 is a schematic diagram 200 illustrating relationships between original media content, an edited version of the media content (e.g., a trailer), and a micro-preview, in accordance with at least one embodiment. For example, timeline 202 may represent a sequence of portions of a movie (e.g., scenes labeled "A" through "N") from a beginning time 204 to an end time 206 (e.g., representing a duration of 1 hour and 20 minutes). The combination of the scenes A-N comprise the whole of Movie "A." Each scene may be a same or different lengths of time. In at least one example, timeline 208 may represent a "trailer" (e.g., an edited version of the original media content, Movie "A"). Trailer "A" may include any combination of the scenes (or portions of scenes) from Movie "A") in any suitable combination (e.g., a same or different combination/order than provided in Move "A"). Additionally, trailer "A" may include additional or different special effects, transitions, or the like than those included in Movie "A." As a non-limiting example, the duration of trailer "A" from start time 210 to end time 212 may be two minutes (or another suitable length of time). It should be understood that the order of scenes or portions of scenes in trailer "A" may be the same or may differ from the order of scenes in Movie "A." Trailer "A" may further provide multiple sub-portions of scenes in a same or different order than they appear in the Movie "A."

The trailer (or other media content item) may be edited in a studio, for example, using film editing techniques. The editing may include rearranging scenes from the movie into a new sequence to provide an overview of the entire movie over a shorter period of time than a duration of the actual movie. The trailer may be created to serve as an advertisement for the movie.

In at least one embodiment, the micro-preview engine 102 of FIG. 1 may determine a start time 214 as correlating to some portion (e.g., 78%) through trailer "A." In some examples, the micro-preview engine 102 may determine that a micro-preview should begin at start time 214. Alternatively, the micro-preview engine 102 may determine that there is a scene change (depicted at time 216) within a threshold distance (e.g., a threshold duration of time before or after the start time 24). Accordingly, the micro-preview engine 102 may modify the start time 214 to coincide with a time 216 and cause the micro-preview to begin playing at the time 216 instead of at start time 214.

In at least one embodiment, the micro-preview engine 102 of FIG. 1 may determine different micro-previews for different users. In the example depicted in FIG. 2, the micro-preview is depicted as included the scene "L," "M," and "E." However, depending on known user information, the micro-preview engine may determine that another user may be provided a micro-preview consisting of the scenes "K," "L," and "M."

In accordance with at least one embodiment, the micro-preview engine 102 of FIG. 1 may begin buffering and streaming the micro-preview "A" according to timeline 218. In some examples, the micro-preview engine 102 may begin playing the micro-preview at start time 220 which coincides with the time 216 of trailer "A." In at least one example, the micro-preview engine 102 may determine that the micro-preview should play for a duration of 20 seconds (represented by duration 222). In other examples, the micro-preview engine 102 may determine that the micro-preview should play for a duration of 28 seconds (represented by duration 226) or until an end time 228 that corresponds to an end of trailer "A." The micro-preview engine 102 may determine any suitable duration to play the micro-preview. In some examples, the micro-preview engine 102 may analyze the trailer "A" within a threshold period of time (e.g., before or after 2 seconds) from an initially-determined end time and may adjust the end time to coincide with a scene change in much the same manner as discussed above in connection with start time 214 and time 216.

Figure 3:
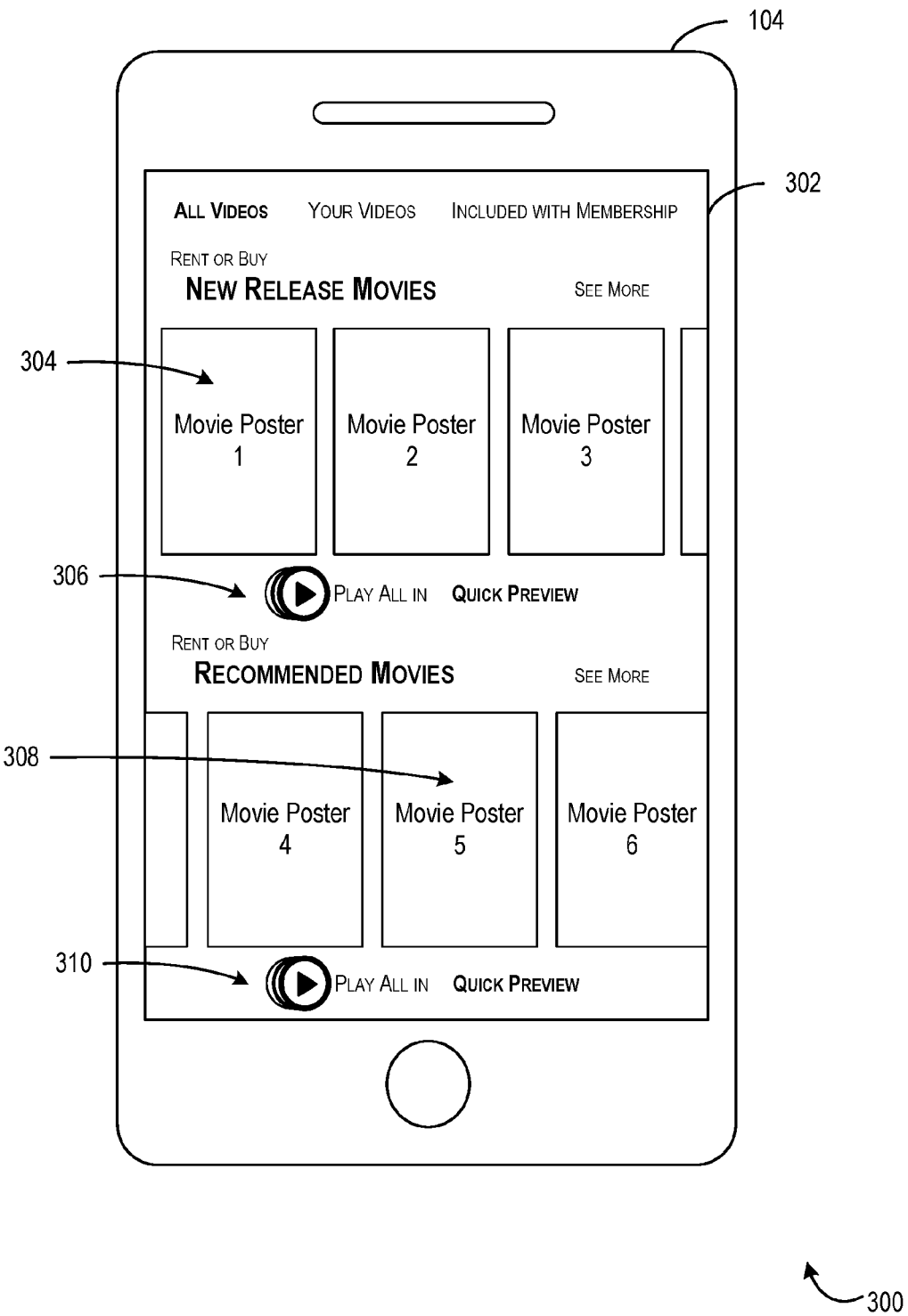
FIG. 3 is a schematic diagram of an interface for browsing a motion picture library, the interface being provided by the micro-preview engine, in accordance with at least one embodiment.

FIG. 3 is a schematic diagram 300 of an interface 302 for browsing a motion picture library, the interface 302 being provided by the micro-preview engine 102, in accordance with at least one embodiment. For example, the micro-preview engine 102 may provide graphical element 304 to enable a user to be presented a details page associated with a particular movie (e.g., Movie "A" associated with Movie Poster 1). A "movie poster" may include a still image that may be used to advertise a particular movie. The details page of Movie "A" may include various attributes associated with the movie. In at least one embodiment, the details page may provide further interface options that enable the user to view a micro-preview related to the selected movie.

In at least one embodiment, the interface 302 provided by the micro-preview engine 102 may include graphical element 306. Upon receiving an indication of the selection of the graphical element 306, the micro-preview engine 102 may provide (e.g., play) micro-previews of the entire collection (e.g., all of the movies associated with the "new release" category) consecutively (or sequentially. In a non-limiting example, the entire "new release" collection includes Movie "A" (associated with Movie Poster 1), Movie "B" (associated with Movie Poster 2), and Movie "C" (associated with Movie Poster 3). Upon receiving indication of the selection of the graphical element 306, the micro-preview engine 102 may cause micro-previews (e.g., ten second previews starting 75% of the way through the original preview) of Movie "A," Movie "B," and Movie "C" to play. In at least one embodiment, the micro-previews may be provided by the micro-preview engine consecutively (e.g., back to back without interruption, but in any order) or sequentially (e.g., in a particular order). In other embodiments, the micro-previews may be provided alphabetically, according to a rating, or in any suitable order.

Similarly, the micro-preview engine 102 may provide a graphical element 308 to enable a user to be presented a details page associated with a particular movie (e.g., Movie "E" associated with Movie Poster 5). In at least one embodiment, the user may select graphical element 310, also provided by the micro-preview engine, in order to begin viewing micro-previews of the movies included in the "recommended movies" collection.

Figure 4:
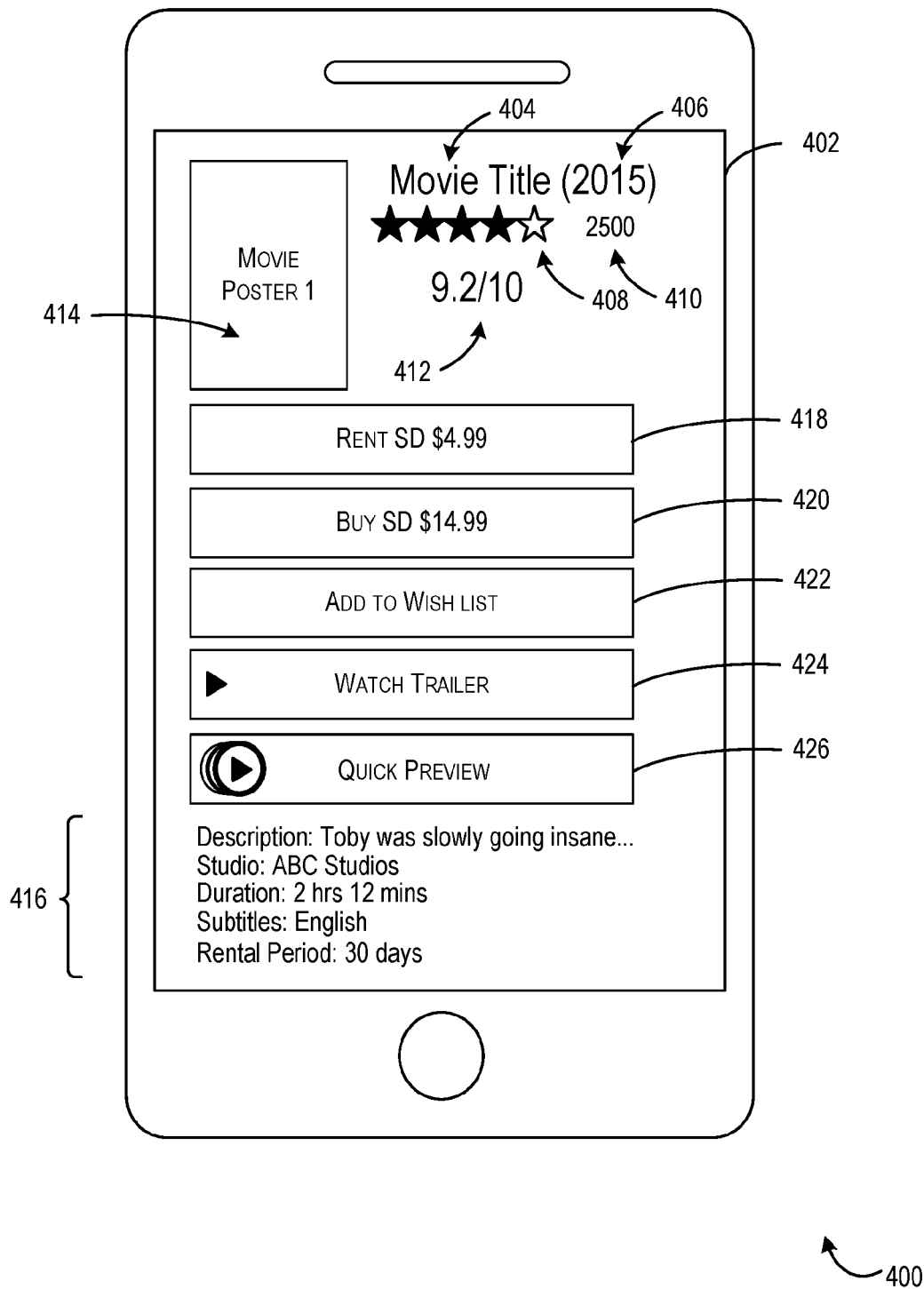
FIG. 4 is a schematic diagram of a details page for providing information and interface options for particular media content, in accordance with at least one embodiment.

FIG. 4 is a schematic diagram 400 of a details page 402 for providing information and interface options for particular media content (e.g., a movie), in accordance with at least one embodiment. For example, the details page 402 may include one or more attributes associated with media content; in this case, a movie. Such attributes may include a movie title 404, a release year 406 (or date), a rating 408 (e.g., 4 out of 5 stars that are provided by consumers, professional critics, or a combination of the two), a review count 410 representing a number of reviews that contribute to the rating 408, an additional rating 412 (e.g., based on a 10 point scale from, for example, an additional source of reviews), a movie poster 414. Additional attributes may include one or more attributes of the information set 416 such as a description of media content (e.g., a plot line description), a producing studio, a duration of the media content, whether the media content provides subtitles and what languages subtitles may be provided, and a rental period a duration for which the user may view the media content if rented.

In at least one embodiment, the details page 402 (provided by the micro-preview engine 102 or the service provider computers 124 of FIG. 1) may include one or more interface options such as an interface option 418, an interface option 420, an interface option 422, an interface option 424, and/or an interface option 426. Additional interface options may be provided other than those depicted in FIG. 4. Similarly, fewer interface options may be provided than the number depicted in FIG. 4. Any suitable combination of interface options may be provided and would be apparent to one skilled in the art of provided options for procuring media content. In the example of FIG. 4, the interface option 418 may correspond to an option to rent the advertised movie in a particular format (e.g., standard definition (SD)) for a particular price (e.g., $4.99). Interface option 320 may correspond to an option to purchase the advertised movie in a particular format (e.g., standard definition (SD)) for a particular price (e.g., $14.99). The interface option 422 may correspond to an option to store an identifier of the advertised movie in a storage container (e.g., a list) associated with the user so that the user may document his interest in the movie. The interface option 424 may correspond to an option to watch the full preview associated with the advertised movie. The interface option 426 may correspond to an option to watch a micro-preview (e.g., a portion of the full trailer).

In at least one embodiment, upon receiving indication that the user has selected the interface option 426, the micro-preview engine 102 may determine a start time and a duration for a micro preview based on the trailer associated with the movie. As described above, the start time and duration may be based on predetermined values or either (or both) the start time and duration may be calculated on information known about the user (e.g., order information, navigation information, user preference information, wish list contents, or the like).

Figure 5:
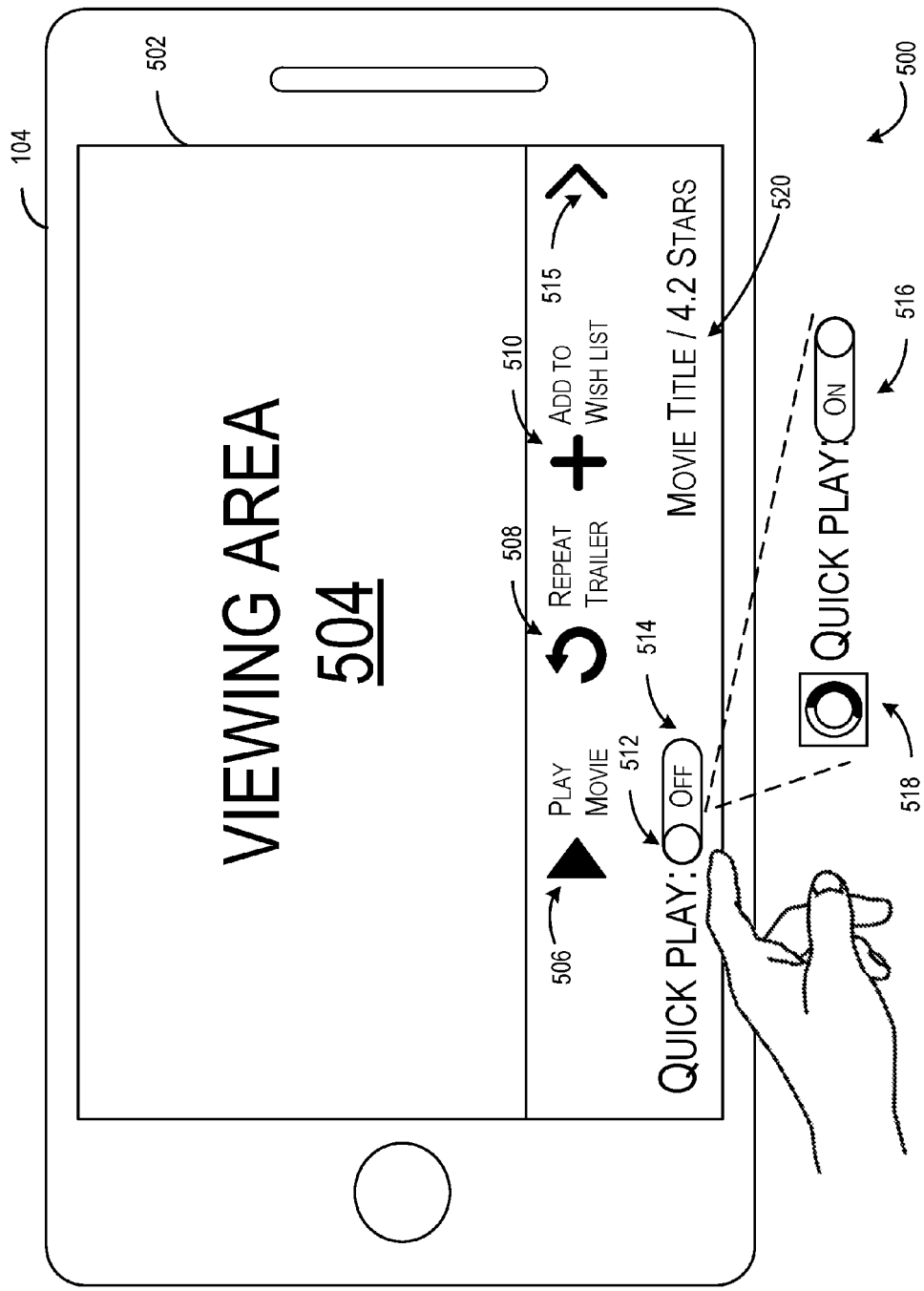
FIG. 5 is a schematic diagram of an interface for browsing a motion picture collection, the interface being provided by the micro-preview engine, in accordance with at least one embodiment.

FIG. 5 is a schematic diagram 500 of an interface 502 for browsing a motion picture collection, the interface 502 being provided by the micro-preview engine 102 of FIG. 1, in accordance with at least one embodiment. For example, the interface 502 may include a viewing area 504. The viewing area 504 may be designated as a portion of the interface 502 that will display the micro-preview currently being played. The viewing area 504 may be proportioned as depicted in FIG. 5, or the viewing area 504 may be proportioned differently than depicted in FIG. 5. The interface 502 may further include play option 506. Selection of the play option 506 may indicate that the user desires to play the movie. Upon selection, the micro-preview engine 102 may cause the user to be navigated to an intermediate page from which the user may order (purchase, lease, or otherwise obtain rights to play) the movie.

In at least one embodiment, the interface 502 may include a repeat trailer option 508. The repeat trailer option 508 may indicate that the user desires to play the full trailer from the beginning. In at least one example, the user may be viewing a micro-preview that does not start at the beginning of the original preview (or other edited content). Upon selection of the repeat trailer option 508, the micro-preview engine 102 may cause the entire preview (or some other portion of the preview other than the micro-preview) to be presented (e.g., played) to the user.

In at least one embodiment, the interface 502 may include an add to wish list option 510. The add to wish list option 510 may be provided by the micro-preview engine 102 to enable a user to indicate that he desires to add the movie title to a "wish list." A "wish list" refers to user-defined listing of media content identifiers (e.g., titles, product identifiers, etc.) that is stored for future reference. The micro-preview engine 102 may utilize a wish list in order to maintain a record of media content that a user is potentially interested in ordering in the future. Upon selection of the wish list option 510, the micro-preview engine 102 may cause a movie identifier associated with the micro-preview being played to be stored as part of a wish list associated with the user. In at least one example, selecting the add to wish list option 510 may result in one or more additional interfaces being displayed to the user. For example, the user may have defined more than one wish list. In response to receiving indication of the selection of the add to wish list option 510, the micro-preview engine 102 may provide the user the ability to select a particular wish list (e.g., from a list).

In at least one embodiment, the micro-preview engine 102 may include a quick play option 512 via the interface 502. The quick play option 512 is depicted as being turned off at 514. While the quick play option 512 is disabled (e.g., off), the user may view each micro-preview from a starting point (e.g., as determined by the micro-preview engine 102 of FIG. 1, such as 80% of the way through the micro-preview) to the end of the micro-preview (e.g., the end of the original movie trailer). At any suitable time, the user may select an interface option such as an interface element 515 (or on a gesture-enabled device, left swipe) to advance to the next micro-preview. In at least one example, the micro-preview engine 102 may provide additional interface options such as a back button (not depicted) and/or the user may be enabled to provide a gesture (e.g., swipe right) to navigate to the previous micro-preview in the collection.

In at least one embodiment, the user may enable the quick play mode by selecting the quick play option 512 and sliding the thumb to an "on" position as depicted at 516. It should be appreciated that other interface elements may be utilized as a toggle for the quick play mode such as a radio button, a check box, a button, or the like. In at least one example, turning on the quick play feature may begin playing each micro-preview of the collection consecutively (or sequentially) from the normal starting point for a particular duration (e.g., eight seconds, or some suitable predetermined period of time). While the micro-previews are being automatically played, the micro-preview engine 102 may automatically advance to the next micro-preview when the predefined duration has elapsed on the micro-preview currently being played. In at least one example, the duration for each micro-preview may differ depending on order history information or other suitable information known of the user.

Figure 6:
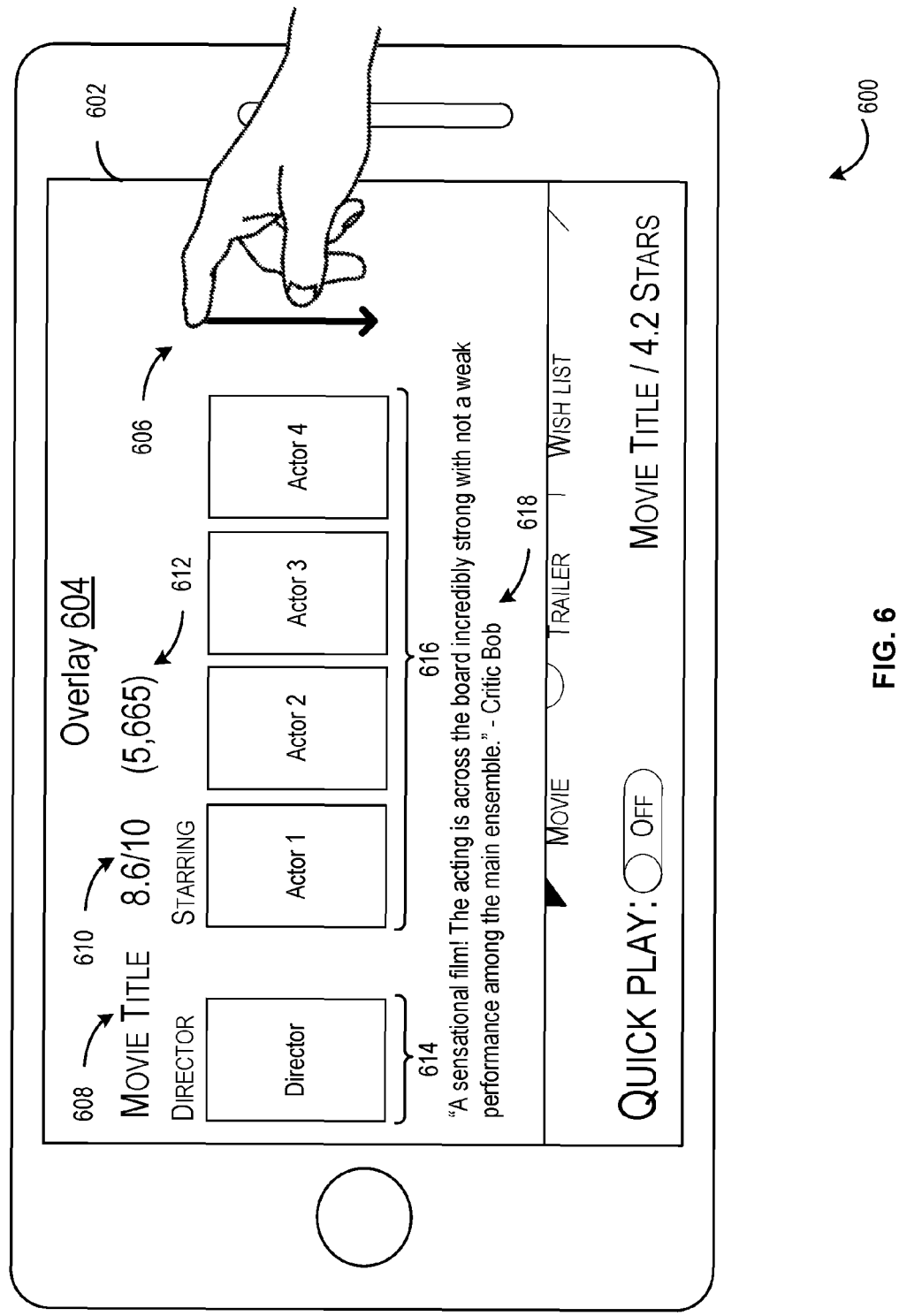
FIG. 6 is a schematic diagram of an interface for providing a number of viewing and storage features while playing micro-previews of a motion picture collection, the interface being provided by the micro-preview engine, in accordance with at least one embodiment.

FIG. 6 is a schematic diagram 600 of an interface 602 for providing a number of viewing and storage features while playing micro-previews of a motion picture collection, the interface 602 provided by the micro-preview engine 102 of FIG. 1, in accordance with at least one embodiment. For example, while viewing a micro-preview, a user may utilize a gesture (e.g., swipe down within the viewing area 504 of FIG. 5) as depicted at 606 to cause an overlay 604 to be displayed. The overlay 604 may be the same size or a different size as the size depicted in FIG. 6. Utilizing the overlay 604, the micro-preview engine 102 may display various attributes associated with a movie (e.g., the movie corresponding to the micro-preview being currently viewed). The micro-preview engine 102 may utilize the same or different configuration of attributes as the configuration depicted in FIG. 6. As a non-limiting example, attribute 608 (e.g., the title of the movie) may be displayed. Attribute 610 (e.g., corresponding to a similar rating as the rating 412 of FIG. 4) may be displayed. Attribute 612 (e.g., corresponding to a review count contributing to the rating corresponding to attribute 608) may be displayed. Generally, any attribute discussed with respect to FIG. 4 may be displayed within the overlay 604. Additionally, or alternatively, section 614 may be included to provide one or more additioanl attributes associated with the movie (e.g., a director associated with the movie). Additionally, or alternatively, section 616 may be provided within the overlay 604 to provide one or more additional attributes associated with the movie (e.g., one or more actors starring in the movie). In the example depicted in FIG. 6, text 618 is included to provide professional critiques of the movie. In at least one embodiment, the user may swipe up (or another suitable gesture and/or interface selection may be used) to dismiss the overlay 604, causing the viewing area 504 of FIG. 5 to reappear. In some examples, while the overlay 604 is visible, the micro-preview may be paused. In other examples, while the overlay 604 is visible, the micro-preview engine 102 may cause the currently playing micro-preview to continue playback irrespective of a previously-determined playback duration.

As a non-limiting example, a user may be viewing a micro-preview that originally was determined to start at a time corresponding to 75% of the way through a trailer. The micro-preview engine 102 may have previously determined that the micro-preview was to play for a duration of 15 seconds. During playback of the micro-preview, the user may swipe down as depicted at 606 to display the overlay 604. While the user is viewing the overlay 604, the micro-preview may continue to play passed the 15 second duration until, for example, the end of the trailer. As such time, the micro-preview engine 102 may cause the playback of the collection to be paused so the user may complete his review of the movie attributes. Upon completing his review, the user may swipe up to dismiss the overlay 604 and the micro-preview engine 102 may cause playback of the collection to resume (e.g., by proceeding to play the next, or another, micro-preview in the collection).

Figure 7:
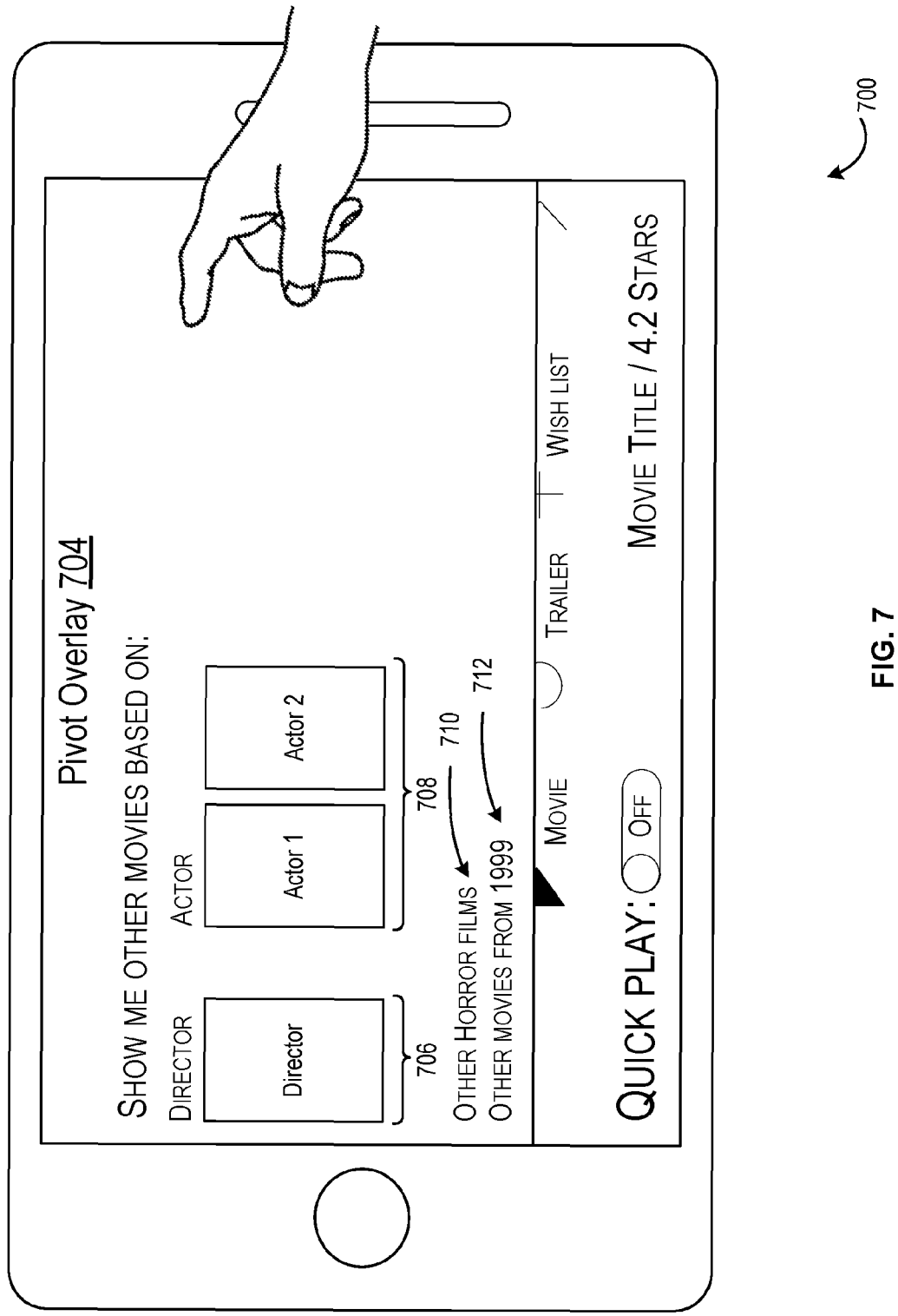
FIG. 7 is a schematic diagram of an interface for pivoting to browse a different collection based on an attribute of a currently-viewed motion picture preview, the interface being provided by the micro-preview engine, in accordance with at least one embodiment.

FIG. 7 is a schematic diagram 700 of an interface 702 for pivoting to browse a different collection based on an attribute of a currently-viewed motion picture preview, the interface 602 being provided by the micro-preview engine 102 of FIG. 1, in accordance with at least one embodiment. For example, an indication of a gesture (such as a swipe down as discussed above in connection with FIG. 7) or an interface selection (e.g., select a menu option, a button, or the like) may be received by the micro-preview engine 102. Upon receipt, the micro-preview engine 102 may present the pivot overlay 704 to the user in a same or similar manner as the overlay 604 of FIG. 6. Within the pivot overlay 704, the user may be provided the ability to select one or more attributes associated with the movie corresponding to the currently played micro-preview. For example, the micro-preview engine may provide graphical element 706 to enable a user to indicate that he wishes to see other micro-previews for movies that share the same director as the director indicated by graphical element 706. The graphical element 706 may include a pictorial representation of a director, for example, or the graphical element 706 may utilize text or another suitable electronic representation for the director. Similarly, the micro-preview engine 102 may provide the graphical elements 708 to enable a user to indicate that the user wishes to see other micro-previews for movies that share one or more actors associated with the graphical elements 708. In still another example, the user may select text 710 (e.g., a hyperlink provided by the micro-preview engine 102) to indicate that he wishes to see movies sharing a genre category with movie corresponding to the currently-viewed micro-preview. In the example depicted in FIG. 7, selection of the text 710 may indicate that the user wishes to see other micro-previews associated with a genre entitled "horror." Similarly, the user may select text 712 to indicate that he wishes to see movies that were released in the same year as the movie corresponding to the currently-viewed micro-preview.

In at least one embodiment, the user may select any combination of the graphical elements depicted in FIG. 7. In some examples, the micro-preview engine 102 may further provide an interface element (e.g., a button or other suitable element) to enable to the user to indicate that he is done selecting one or more attributes from pivot overlay 704. Upon receiving the user's attribute selections, the micro-preview engine 102 may be configured to perform a query utilizing the selected attributes. The pivot overlay 704, in some examples, may be dismissed and the micro-preview engine 102 may the user with a new collection of micro-previews that correspond to the search results returned from the query. The user may utilize the pivot overlay 704 any number of times in order to browse through various collections.

Figure 8:
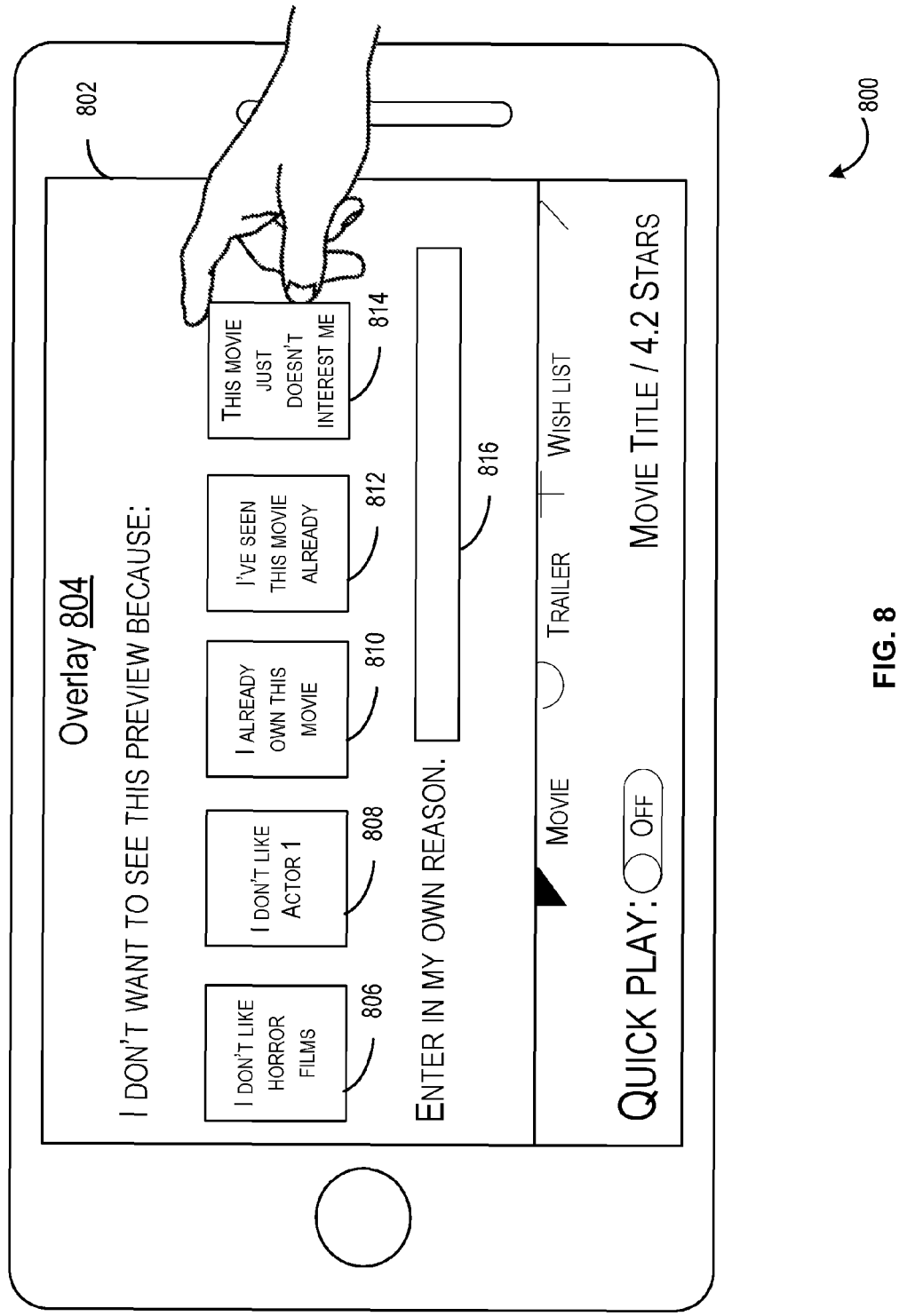
FIG. 8 is a schematic diagram of an interface for providing user feedback, the interface being provided by the micro-preview engine, in accordance with at least one embodiment.

FIG. 8 is a schematic diagram 800 of an interface 802 for providing user feedback, the interface 802 provided by the micro-preview engine, in accordance with at least one embodiment. For example, and overlay 804 may be provided by the micro-preview engine 102 upon receiving indication of a selection of the interface element 515 of FIG. 5, or another suitable indication of modifying playback (e.g., a gesture such as swipe left) of a media content collection (e.g., a collection of micro-previews corresponding to a collection of movies). In at least one embodiment, receipt of the indication of the selection of the interface element 515 may be stored by the micro-preview engine as part of the user preference information associated with the user. Such user preference information may be utilized by the micro-preview engine 102 in order to determine future start times and/or duration for micro-previews to be presented to the user.

In at least one embodiment, the micro-preview engine 102 may provide any suitable combination of the interface elements 806-816 in order to enable the user to provide a reason for which he is choosing to modify playback. For example, the micro-preview engine 102 may provide the interface element 806 the enable the user to indicate that he doesn't care for movies of a particular genre (e.g., the genre "horror" that, in this case, corresponds to the genre associated with the currently-playing micro-preview). Similarly, the micro-preview engine 102 may provide the interface element 808 to enable the user to indicate that he does not care for an actor starring in the currently-playing micro-preview. The micro-preview engine 102 may provide the interface element 810 to enable the user to indicate that the user has previously-purchased the movie corresponding to the currently-playing micro-preview. The micro-preview engine 102 may provide the interface element 812 to enable the user to indicate that the user has already seen (e.g., rented and/or watched the movie in a public movie theatre) the movie corresponding to the currently-playing micro-preview. The micro-preview engine 102 may provide the interface element 814 to enable the user to indicate that the movie corresponding to the currently-playing micro-preview is simply not of interested to him. Additionally, or alternatively, the interface element 816 may be utilized by the user to provide a textual description indicating the reason he has chosen to modify playback.

In at least one embodiment, one or more selections of the interface elements 806-816 may be stored by the micro-preview engine 102 in a data store suitable for storing such information. These selections may be associated, for example, with an account that is associated with the user (e.g., a user profile) so that the selections may be utilized when making future determinations regarding start times and durations for playback of other micro-previews. As a non-limiting example, the user may indicate (e.g., via selection of the interface element 806) that he doesn't like horror films. The micro-preview engine 102 may utilize such information to determine that future micro-previews having a same or similar genre category may include a greater or lesser duration of playback. For example, prior to such a selection, the micro-preview engine 102 may determine that a micro-preview for a horror movie may have a start time of 80% through a trailer and may play for a duration of 12 seconds. However, after analyzing the previous selections made by the user (e.g., via an account associated with the user) the micro-preview engine 102 may modify playback of micro-previews associated with the genre category horror. Such modification may include modifying a start time to 90% of the way through a trailer a playing the micro-preview for only three seconds. In some examples, a single selection of an interface element indicating a reason that the user is modifying playback may stimulate a modification to playback of one or more micro-previews. Whereas in other examples, the user may select the interface element multiple times (and/or over a threshold number of times) before modification of another micro-preview may be modified. It should be appreciated that the interface elements 806-816 are illustrative in nature and that any suitable combination of such interface elements may be used to provide the user with the means to indicate any suitable reason for which playback modification is being requested.

Figure 9:
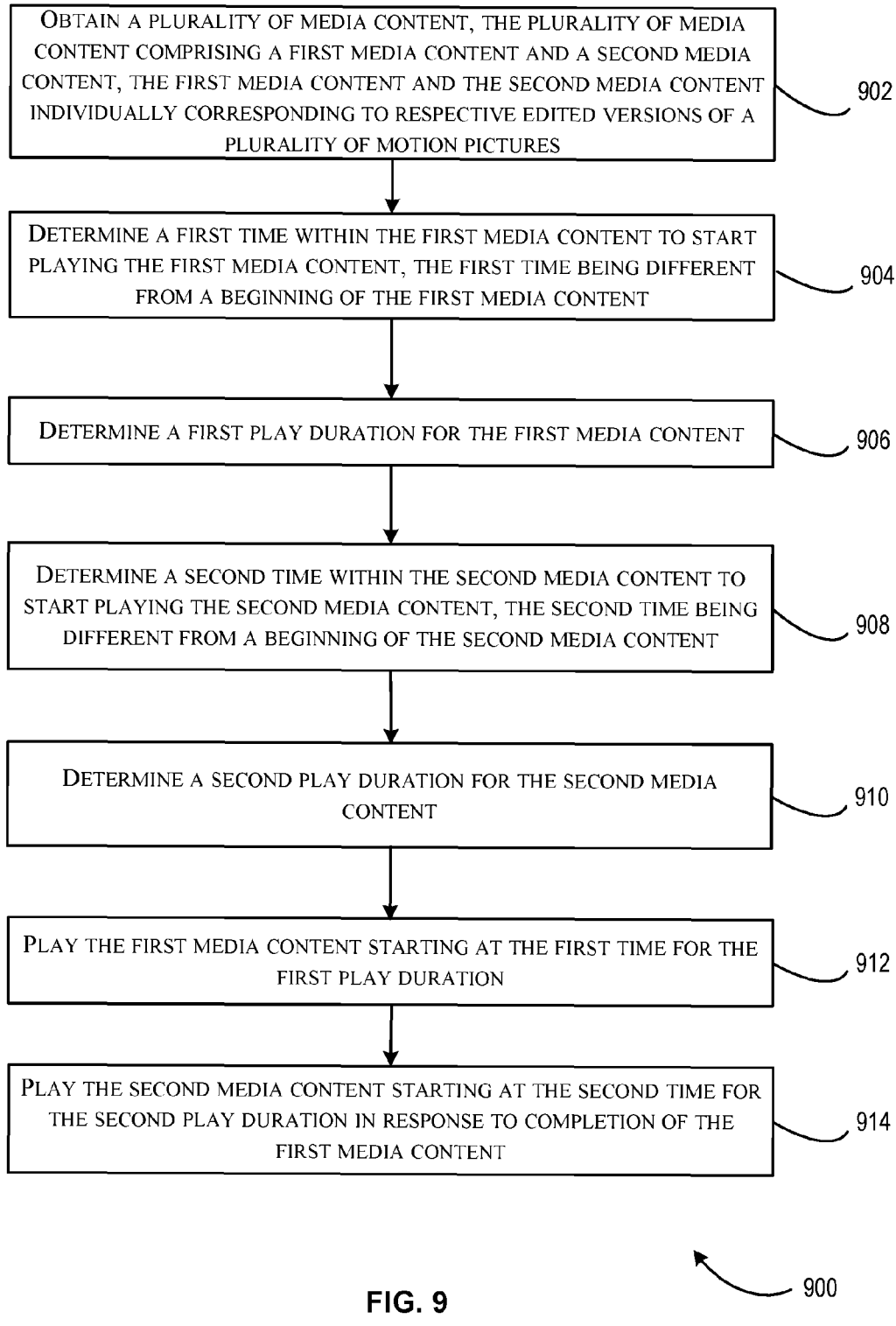
FIG. 9 is a flowchart illustrating another example method for providing a number of previews utilizing the micro-preview engine, in accordance with at least one embodiment.

FIG. 9 is a flowchart illustrating an example method 900 for providing a number of micro-previews utilizing the micro-preview engine 102 of FIG. 1, in accordance with at least one embodiment. The method 900 may begin at block 902 where a plurality of media content (e.g., trailers) may be obtained (e.g., by a media content selection engine 1310 of FIG. 13, a component of the micro-preview engine 102). In some examples, the plurality of media content may comprise a first media content and a second media content. In at least one embodiment, the first media content and the second media content may individually correspond to respective edited versions of a plurality of motion pictures (e.g., movies).

At block 904, a first time within the first media content may be determined (e.g., by the media content selection engine 1310). The first time may indicate a point at which to start playing the first media content (e.g., 80% of the way through a first trailer). In some examples, the first time may be different from a beginning (e.g., time 0) of the first media content.

At block 906, a first play duration for the first media content may be determined. For example, the media content selection engine 1310 may consult a predetermined value (e.g., 10) which may indicate a number of seconds, or some other suitable unit of time, for which to continue playing the first media content.

At block 908, a second time within the second media content may be determined (e.g., by the media content selection engine 1310) to start playing the second media content. The second time may indicate a point at which to start playing the second media content (e.g., 80% of the way through a second trailer, 70% of the way through the second trailer, etc.). In at least one example, the second time may be different from a beginning (e.g., time 0) of the second media content.

At block 910, a second play duration for the second media content may be determined. For example, the media content selection engine 1310 may consult a predetermined value (e.g., 8) which may indicate a number of seconds, or some other suitable unit of time, for which to continue playing the second media content. In at least one example, the predetermined value may be associated with an attribute (e.g., a category, a director, an actor, etc.) of the second media content and/or an attribute of the motion picture corresponding to the second media content.

At block 912, the first media content may be played starting at the first time for the first play duration. In at least some examples, the buffering engine 1312 of FIG. 13 may begin buffering at the first time. Accordingly, amount of data to be buffered/stream may be reduced as a portion of the first media content existing prior to the first time may not be buffered.

At block 914, the second media content may be played starting at the second time for the second play duration. In at least some examples, second media content may be played in response to completion of the first media content.

Figure 10:
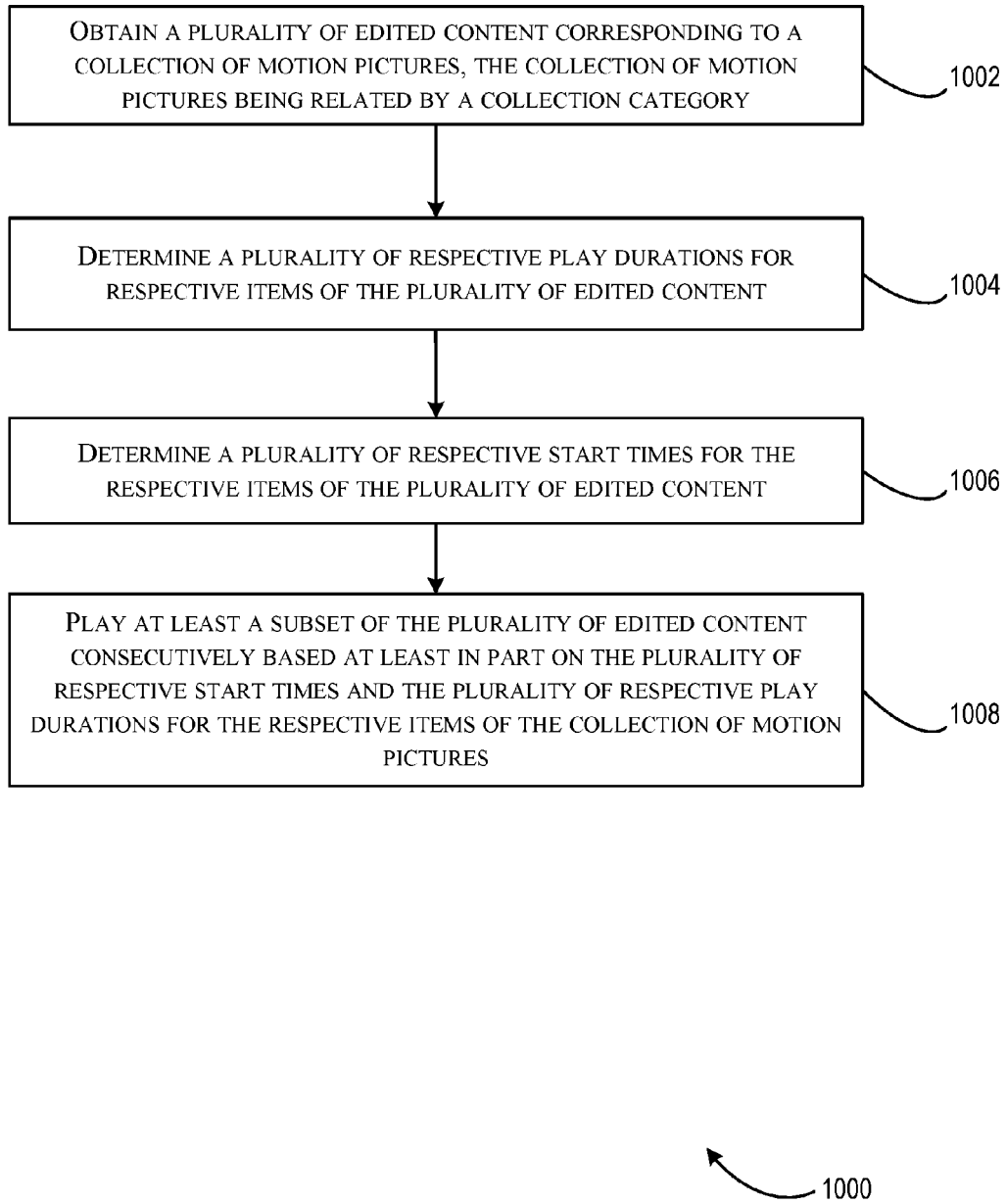
FIG. 10 is a flowchart illustrating a further example method for providing a number of previews utilizing the micro-preview engine, in accordance with at least one embodiment.

FIG. 10 is a flowchart illustrating another example method 1000 for providing a number of micro-previews utilizing the micro-preview engine 102 of FIG. 1, in accordance with at least one embodiment. The method 1000 may begin at block 1002 where a plurality of edited content (e.g., trailers) corresponding to a collection of motion pictures may be obtained (e.g., by a media content selection engine 1310 of FIG. 13, a component of the micro-preview engine 102). In some examples, the collection of motion pictures may be related by a collection category (e.g., "horror," "movies from 1999," "drama," "movies starring Actor X," "Movies produced by Director Y," "Movies having a run time less than two hours," etc.).

At block 1004, a plurality of respective play durations for respective items (e.g., micro-previews) of the plurality of edited content may be determined (e.g., by the media content selection engine 1310). In some examples, the media content selection engine 1310 may determine a same or different duration for each respective item.

At block 1006, a plurality of respective play start times for respective items (e.g., micro-previews) of the plurality of edited content may be determined (e.g., by the media content selection engine 1310). In some examples, the media content selection engine 1310 may determine a same or different start time for each respective item.

At block 1008, at least a subset of the plurality of edited content may be played consecutively (e.g., by the output manager 1314 of FIG. 13) based at least in part on the plurality of respective start times and the plurality of respective play durations for the respective items of the collection of motion pictures.

Figure 11:
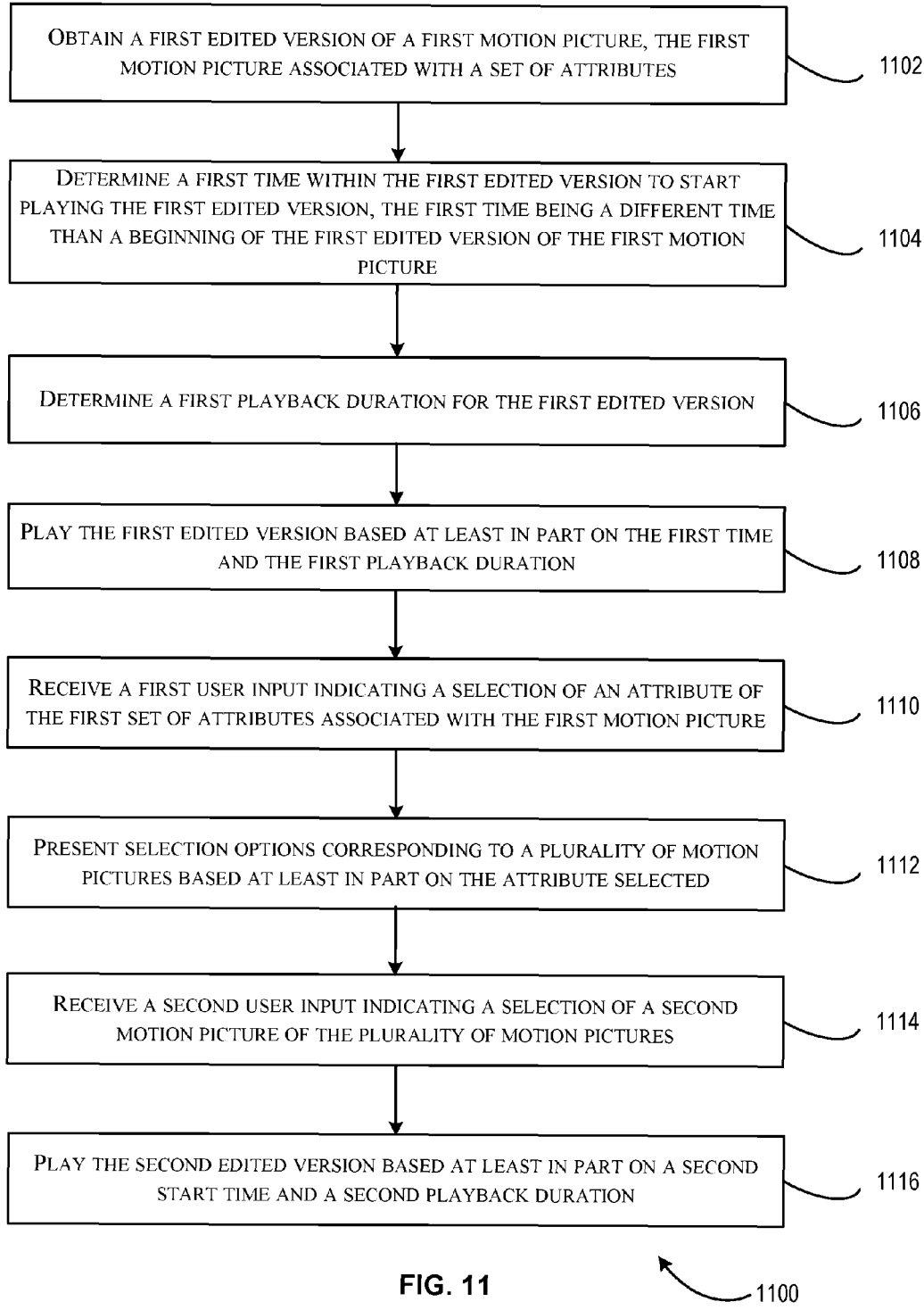
FIG. 11 is a flowchart illustrating still one further example method for providing a number of previews utilizing the micro-preview engine, in accordance with at least one embodiment.

FIG. 11 is a flowchart illustrating still one further example method 1100 for providing a number of micro-previews utilizing the micro-preview engine 102 of FIG. 1, in accordance with at least one embodiment. The method 1100 may begin at block 1102 where a first edited version (e.g., a first trailer) of a first motion picture may be obtained (e.g., by a media content selection engine 1310 of FIG. 13, a component of the micro-preview engine 102). In at least one example, the first motion picture may be associated with a set of attributes (e.g., movie title, plot description, release date, one or more actors, one or more directors, one or more producers/studios, a run time, a genre, a rating, or the like).

At block 1104, a first time within the first edited version to start playing the first edited version may be determined (e.g., by the media content selection engine 1310). In at least one example, the first time may be a different time than a beginning of the first edited version of the first motion picture.

At block 1106, a first playback duration for the first edited version may be determined (e.g., by the media content selection engine 1310). The media content selection engine 1310 may consult a mapping or other predetermined value to determine the first playback duration. In some examples, the media content selection engine 1310 may determine the first playback duration based on one or more attributes associated with the first edited version, and/or historical order information associated with a user, and/or historical navigational information associated with a user.

At block 1108, the first edited version may be played (e.g., by the output manager 1314 of FIG. 13) based at least in part on the first time and the first playback duration determined from block 1104 and block 1106.

At block 1110, a first user input indicating a selection of an attribute of the first set of attributes associated with the first motion picture may be received (e.g., by the media content selection engine 1310). At block 1112, the media content selection engine 1310 may present (or cause another component or system to present) selection options corresponding to a plurality of motion pictures based at least in part on the attribute selected. As a non-limiting example, the first user input may indicate a selection of a particular actor (e.g., Actor "A"). The media content selection engine 1310 may execute a query against a data store utilized the selected attribute in order to obtain identifiers of one or more motion pictures that are associated with the selected attribute.

At block 1112, a second user input indicating a selection of a second motion picture of the plurality of motion pictures may be received (e.g., by the media content selection engine 1310). For example, the user may be provided interface options with which to select a particular motion picture from the motions pictures obtained from the query execution discussed above with respect to block 1110.

At block 1114, the second edited version may be played (e.g., by the output manager 1314) based at least in part on a second start time and a second playback duration. In other words, the media content selection engine 1310 may determine a corresponding start time and playback duration for the second edited version of the second motion picture in a similar manner as discussed above with respect to block 1104 and block 1106.

Figure 12:
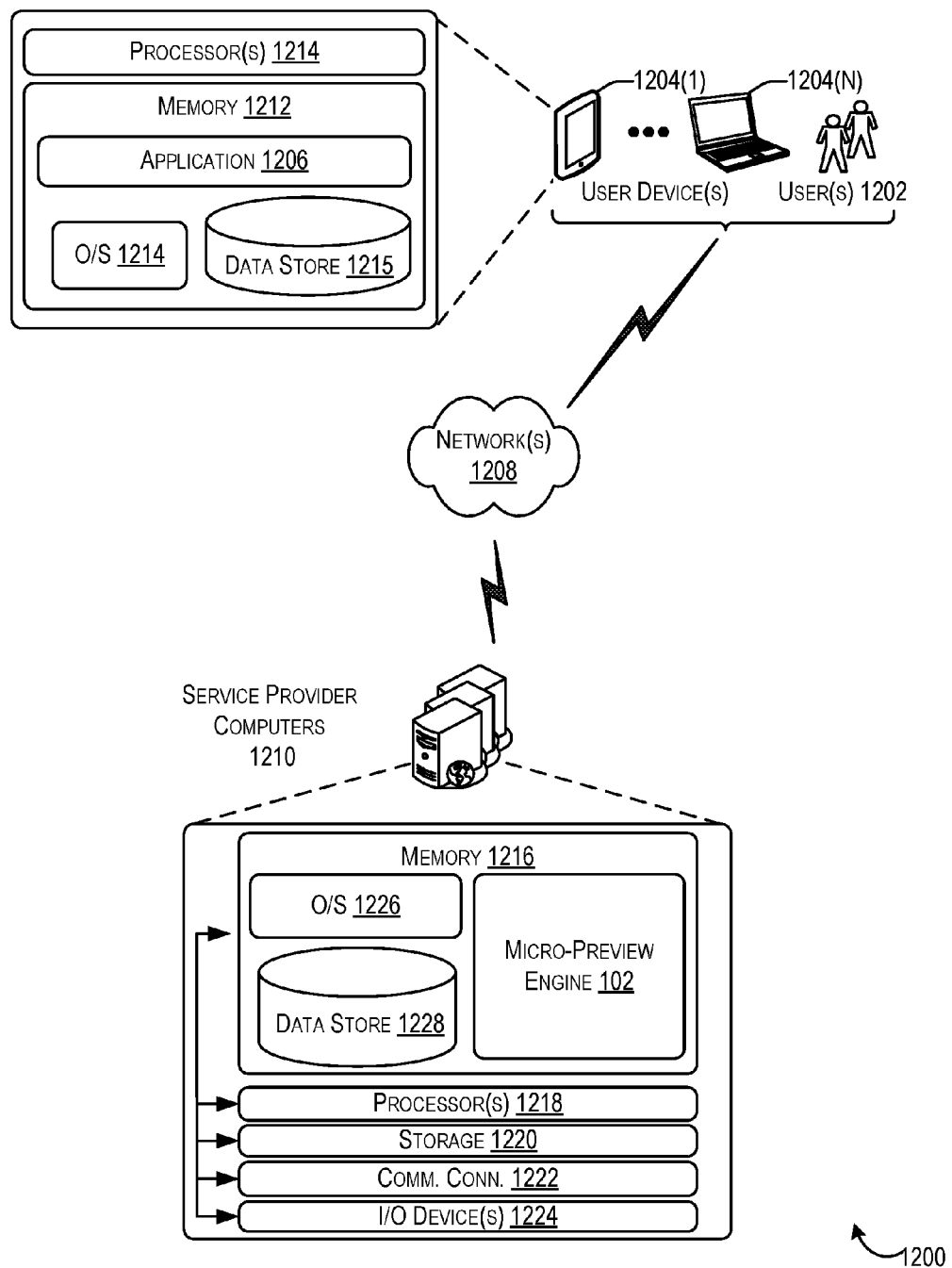
FIG. 12 is an example architecture of the micro-preview engine, in accordance with at least one embodiment.

FIG. 12 is an example architecture 1200 of a micro-preview engine 102 (e.g., the micro-preview engine 102 of FIG. 1), in accordance with at least one embodiment. In architecture 1200, one or more users 1202 may utilize a user device (e.g., the user device 104 of FIG. 1) of a collection of user computing devices 1204(1)-(N) (collectively, user computing devices 1204) to access an application 1206 (e.g., a media content browsing application, a web browser, etc.) or a user interface accessible through the application 1206 via one or more networks 1208 (e.g., the network 128 of FIG. 1). In some aspects, the application 1206 may be hosted, managed, and/or provided by a computing resources service or service provider, such as by utilizing one or more service provider computers 1210 (the service provider computers 124 of FIG. 1).

In some examples, the networks 1208 may include any one or a combination of many different types of networks, such as cable networks, the Internet, wireless networks, cellular networks, and other private and/or public networks. While the illustrated example represents the users 1202 accessing the application 1206 over the networks 1208, the described techniques may equally apply in instances where the users 1202 interact with the service provider computers 1210 via the one or more user computing devices 1204 over a landline phone, via a kiosk, or in any other suitable manner. It should be appreciated that the described techniques may apply in other client/server arrangements, as well as in non-client/server arrangements (e.g., locally stored applications, etc.).

As described briefly above, the application 1206 may allow the users 1202 to interact with the service provider computers 1210 such as to browse for items (e.g., media content) offered by an electronic marketplace utilizing the application 1206. The service provider computers 1210, perhaps arranged in a cluster of servers or as a server farm, may host the application 1206 and/or cloud-based software services. Other server architectures may also be used to host the application 1206 and/or cloud-based software services. The application 1206 may be capable of handling requests from the users 1202 and serving, in response, various user interfaces that can be rendered at the user computing devices

1204. The application 1206 can present any suitable type of website that supports user interaction, including search engine sites. The described techniques can similarly be implemented outside of the application 1206, such as with other applications running on the user computing devices 1204.

The user computing devices 1204 (e.g., the user device 104) may be any suitable type of computing device such as, but not limited to, a mobile phone, a smartphone, a personal digital assistant (PDA), a laptop computer, a desktop computer, a thin-client device, a tablet PC, an electronic book (e-book) reader, etc. In some examples, the user computing devices 1204 may be in communication with the service provider computers 1210 via the networks 1208, or via other network connections.

In one illustrative configuration, the user computing devices 1204 may include at least one memory 1212 and one or more processing units (or processor(s)) 1214. The processor(s) 1214 may be implemented as appropriate in hardware, computer-executable instructions, firmware, or combinations thereof. Computer-executable instruction or firmware implementations of the processor(s) 1214 may include computer-executable or machine-executable instructions written in any suitable programming language to perform the various functions described.

The memory 1212 may store program instructions that are loadable and executable on the processor(s) 1214, as well as data generated during the execution of these programs. The memory 1212 may include an operating system 1214, one or more data stores 1215, and/or one or more application programs, modules, or services for implementing the features disclosed herein including one or more features of the micro-preview engine 102. Depending on the configuration and type of user computing device, the memory 1212 may be volatile (such as random access memory (RAM)) and/or non-volatile (such as read-only memory (ROM), flash memory, etc.). The user computing devices 1204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1212 may include multiple different types of memory, such as static random access memory (SRAM), dynamic random access memory (DRAM), or ROM.

Turning to the contents of the memory 1212 in more detail, the memory 1212 may include an operating system and one or more application programs, modules, or services for implementing the features disclosed herein, such as via the application 1206 (e.g., a reading application). The application 1206 may be configured to receive, store, and/or display a network page or other interface for interacting with the service provider computers 1210. Additionally, the memory 1212 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

In some aspects, the service provider computers 1210 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers 1210 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computers 1210 may be in communication with the user computing devices 1204 and/or other service providers via the networks 1208 or via other network connections. The service provider computers 1210 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computers 1210 may include at least one memory 1216 and one or more processing units (or processor(s)) 1218. The processor(s) 1218 may be implemented as appropriate in hardware, computer-executable instructions, firmware, or combinations thereof. Computer-executable instruction or firmware implementations of the processor(s) 1218 may include computer-executable or machine-executable instructions written in any suitable programming language to perform the various functions described.

The memory 1216 may store program instructions that are loadable and executable on the processor(s) 1218, as well as data generated during the execution of these programs. Depending on the configuration and type of service provider computers 1210, the memory 1216 may be volatile (such as RAM) and/or non-volatile (such as ROM, flash memory, etc.). The service provider computers 1210 or servers may also include additional storage 1220, which may include removable storage and/or non-removable storage. The additional storage 1220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1216 may include multiple different types of memory, such as SRAM, DRAM, or ROM.

The memory 1216, the additional storage 1220, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1216 and the additional storage 1220 are all examples of computer storage media. Additional types of computer storage media that may be present in the service provider computers 1210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computers 1210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computers 1210 may also contain communications connection(s) 1222 that allow the service provider computers 1210 to communicate with a stored database, another computing device or server, user terminals and/or other devices on the networks 1208. The service provider computers 1210 may also include I/O device(s) 1224, such as a keyboard, a mouse, a pen, a voice input device, a touch input device, a display, speakers, a printer, etc.

Turning to the contents of the memory 1216 in more detail and will be described in further detail in FIG. 12, the memory 1216 may include an operating system 1226, one or more data stores 1228, and/or one or more application programs, modules, or services for implementing the features disclosed herein, such as the features provided by the micro-preview engine 102 of FIG. 1.

Figure 13:
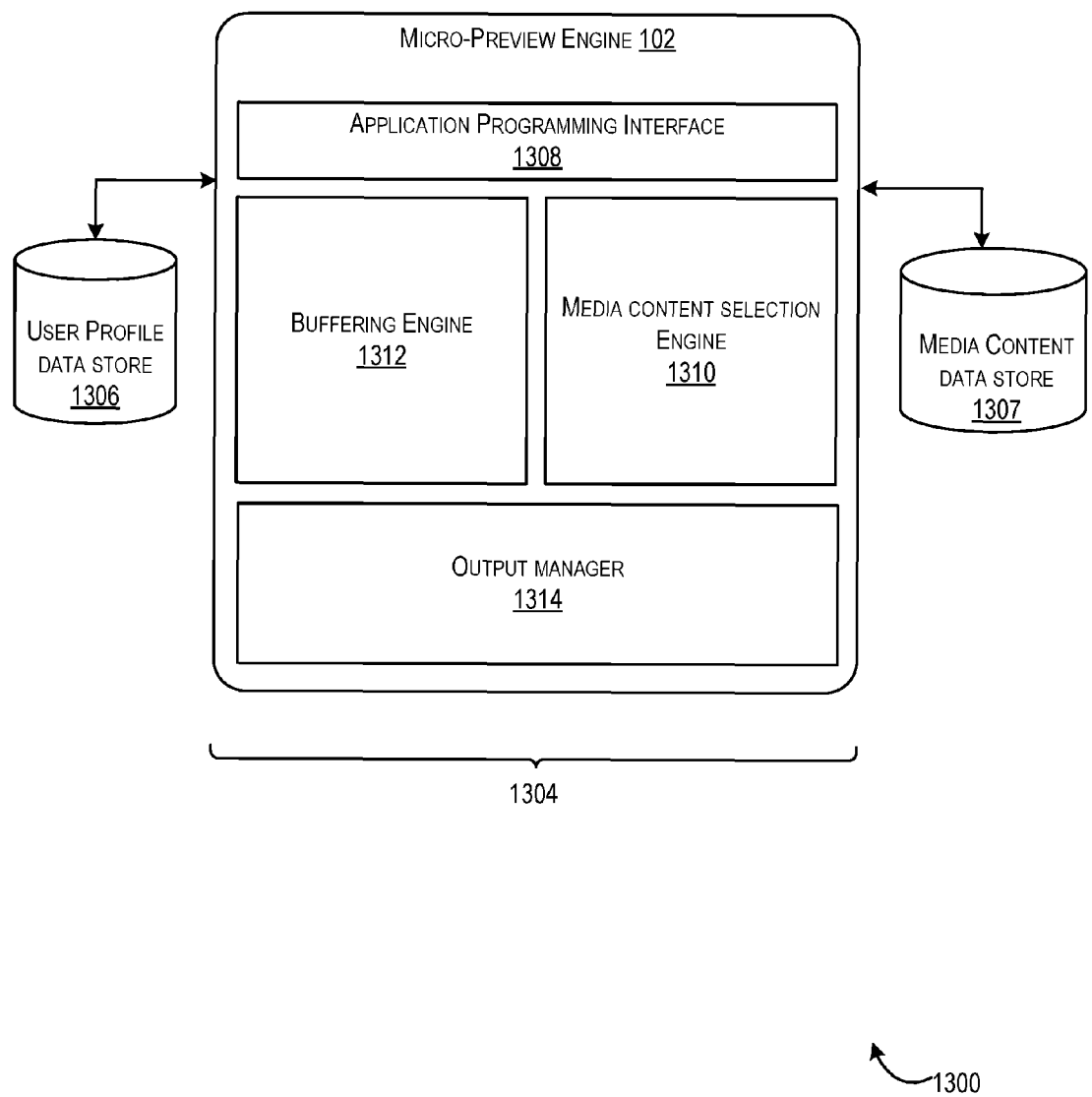
FIG. 13 is a schematic diagram of an example computer architecture for the micro-preview engine, including a plurality of modules that may carry out various embodiments.

FIG. 13 schematically illustrates an example computer architecture 1300 for the micro-preview engine 102 of FIG. 1, including a plurality of modules 1304 that may carry out various embodiments. The modules 1304 may be software modules, hardware modules, or a combination thereof. If the modules 1304 are software modules, the modules 1304 can be embodied on a computer readable medium and processed by a processor in any of the computer systems described herein. It should be noted that any module or data store described herein, may be, in some embodiments, a service responsible for managing data of the type required to make corresponding calculations. The modules 1304 may be configured in the manner suggested in FIG. 13 or the modules 1304 may exist as separate modules or services external to the micro-preview engine 102. For example, any combination of modules 1304 may be executed, in whole or in part, on the service provider computers 124 of FIG. 1 or the service provider computers 1210 of FIG. 12. Likewise, any combination of modules 1304 may be executed, in whole or in part, on the user computing devices 1204 of FIG. 12 (e.g., the user device 104 of FIG. 1), for example, as part of the application 1206 of FIG. 12.

In the embodiment shown in the drawings, a user profile data store 1306 and a media content data store 1307 are shown, although data can be maintained, derived, or otherwise accessed from various data stores, either remote or local to the micro-preview engine 102, to achieve the functions described herein. In at least one embodiment, the data stores described herein may be physically located on a user device (e.g., the user device 104) or alternatively, any suitable combination of the data stores may be operated as part of the service provider computers 1210, for example, as part of a media content service of an electronic marketplace. The micro-preview engine 102, as shown in FIG. 13, includes various modules such as an application programming interface 1308, a media content selection engine 1310, a buffering engine 1312, and an output manager 1314. Some functions of the modules 1308, 1310, 1312, and 1314 are described below. However, for the benefit of the reader, a brief, non-limiting description of each of the modules is provided in the following paragraphs.

In accordance with at least one embodiment, a process is enabled for generating micro-previews utilizing the micro-preview engine 102 of FIG. 1, in accordance with at least one embodiment. Input may be received via the application programming interface 1308 (e.g., a request for a micro-preview corresponding to a movie, the request being initiated, for example, via graphical element 306 of FIG. 3). In at least some examples, the request may specify attributes associated with the media content (e.g., a title associated with a movie, a content identifier, a category associated with a collection of movies, a number of content identifiers corresponding to a collection of movies, etc.). The application programming interface 1308 may be utilized to receive and/or provide information to or from the micro-preview engine 102 with respect to any example provided herein.

In at least one embodiment, a request for a micro-preview (or a collection of micro-previews corresponding to a collection of movies such as "new releases") may be received by the media content selection engine 1310, a component of the micro-preview engine 102. The media content selection engine 1310 may retrieve various trailers (e.g., edited content) corresponding to the movie(s) included in the request. For each retrieved trailer, the media content selection engine 1310 may determine a start time from which to begin playing the micro-preview. For example, the media content selection engine 1310 may obtain a predetermined value (e.g., 0.75) that indicates that a movie begin a portion (e.g., 75%) of the way through a trailer. In such examples, the media content selection engine 1310 may multiply the predetermined value by the total time corresponding to a duration of a trailer to calculate a start time for the micro-preview. In a similar vein, the media content selection engine 1310 may obtain a predetermined value (e.g., 10) indicating a duration for the micro-preview (e.g., 10 seconds).

In at least one embodiment, the media content selection engine 1310 retrieve a set of attributes associated with the movie corresponding to the requested micro-previews (e.g., a genre category). The media content selection engine 1310 may access and/or retrieve order history information associated with the user requesting the micro-previews from, for example, the user profile data store 1306, a data store configured to store such information. Additionally, or alternatively, the media content selection engine 1310 may access and/or retrieve historical navigational data corresponding to past selection made by the user that resulted in modification of a playback of one or more micro-previews. The media content selection engine 1310 may access various attributes of the movies for which micro-preview playback was modified via either the user profile data store 1306 and/or the media content data store 1307. Upon accessing and/or retrieving the historical transaction data and/or the historical navigational data of the user, the media content selection engine 1310 may, utilizing machine learning techniques for example, determine a degree (e.g., a probability value) to which the user may be interested in the subject micro-preview. For example, the media content selection engine 1310 may determine that the user has "skipped" or otherwise modified playback of micro-previews associated with "romantic comedies" a threshold number of times in the past. Accordingly, the media content selection engine 1310 may calculate a duration for the micro-preview that is shorter than a predetermined value (e.g., 10 seconds) or otherwise shorter than durations associated with micro-previews for which playback is modified by the user less frequently (or not at all).

As a non-limiting example, a media content selection engine 1310 may determine a duration of 5 seconds for a micro-preview of a "drama" movie and a duration of 10 seconds for a "horror" movie based on determining that the user modifies playback of dramatic movies more frequently than he does horror movies. Similarly, the media content selection engine 1310 may calculate longer durations for micro-previews that share a common attribute to movies that the user has rented or purchased in the past.

In at least one example, the media content selection engine 1310 may analyze an original trailer obtained from the media content data store 1307 within a threshold period of time (e.g., 2 seconds, 5 seconds, 1 second, etc.) before or after an initially determined start time. In some examples, the media content selection engine 1310 will compare pixel color between one or more frames with the threshold period of time of the start time to determine whether or not a scene change occurs with the threshold period of time. In at least some examples, the media content selection engine 1310 may modify a start time when a scene change is found within the threshold. Accordingly, the start time may be adjusted to a time before or after the initial time so as to coincide with the scene change. Thus, the user is provided a more polished experience as the micro-preview begins at a more natural starting place than would otherwise occur.

In at least one embodiment, the media content selection engine 1310 may communicate to the buffering engine 1312 a start time, a duration (and/or an end time) for the micro-preview. The buffering engine 1312 may retrieve, or otherwise obtain, the original trailer information and may begin buffering data corresponding to the trailer starting at the start time until the buffer is full and/or the duration of the original trailer has been met. The buffering engine 1312 may communicate the buffered data to the output manager 1314, a component of the micro-preview engine 102, that is configured to present the buffered data to the user (e.g., via the viewing area 504 of FIG. 5).

In accordance with at least one embodiment, the media content selection engine 1310 may receive an indication that the user has selected one or more interface options (e.g., an indication of a swipe down as discussed above in connection with FIG. 6) that require playback of the micro-preview to be modified. Accordingly, the media content selection engine 1310 may modify the duration associated with the micro-preview and send such information to the buffering engine 1312. In other examples, the media content selection engine 1310 may send an indication to the buffering engine 1312 to continue playback until the end of the original trailer or until directed otherwise. Upon receipt of an indication that the user has returned his focus to the micro-preview (e.g., via a swipe up gesture to dismiss overlay 604 of FIG. 6) the media content selection engine 1310 may again modify the duration of the micro-preview and send such information to the buffering engine 1312. Alternatively, the media content selection engine 1310 may send an indication to the buffering engine 1312 to begin buffering another micro-preview in the collection currently being played. In still another example, an indication that the user is consulting additional information related to the movie (e.g., via overlay 604) may cause the media content selection engine 1310 to determine the start time of the micro-preview. For example, a micro-preview may begin at 1 minute (or some portion) through the original trailer. When the user views information about the movie, the media content selection engine 1310 may, at any suitable time during the viewing, send an indication to the buffering engine 1312 to begin playing the entire trailer from a beginning of the trailer.

In accordance with at least one embodiment, the media content selection engine 1310 may receive indication that the user desires to view a new collection of micro-previews. For example, the media content selection engine 1310 may receive a request indicating one or more attributes associated with a movie (e.g., via interface selections such as those discussed above in connection with FIG. 6). Accordingly, the media content selection engine 1310 may execute a query including one or more of the attributes against the media content data store 1307 in order to retrieve a set of movies that correspond to a result set of the executed query. The media content selection engine 1310 may, in some examples, determine respective start times and durations in a similar manner as discussed above. Additionally, the media content selection engine 1310 may communicate such start times and durations to the buffering engine 1312 in order to effectuate playback of the micro-previews associated with the new collection requested by the user.

Figure 14:
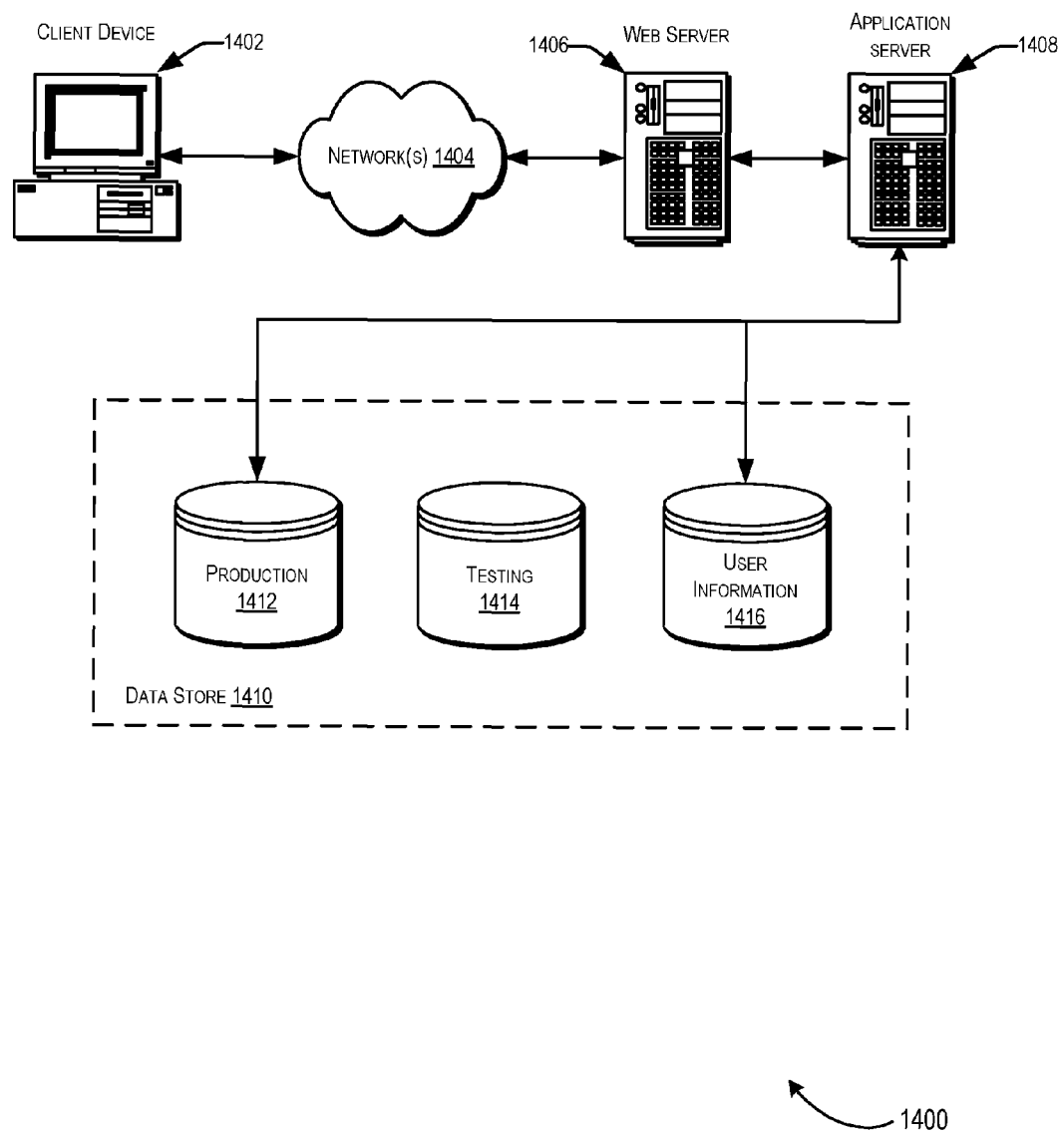
FIG. 14 is a schematic diagram illustrating an example environment for implementing aspects in accordance with at least one embodiment described herein.

FIG. 14 illustrates aspects of an example environment 1400 for implementing aspects in accordance with various embodiments. As will be appreciated, although a Web-based environment is used for purposes of explanation, different environments may be used, as appropriate, to implement various embodiments. The environment includes an electronic client device 1402, which can include any appropriate device operable to send and receive requests, messages, or information over an appropriate network 1404 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1406 for receiving requests and serving content in response thereto, although for other networks an alternative device serving a similar purpose could be used as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1402 and the application server 1408, can be handled by the Web server. It should be understood that the Web and application servers are not required and are merely example components, as structured code discussed herein can be executed on any appropriate device or host machine as discussed elsewhere herein.

The data store 1410 can include several separate data tables, databases or other data storage mechanisms and media for storing data relating to a particular aspect. For example, the data store illustrated includes mechanisms for storing production data 1412 and user information 1416, which can be used to serve content for the production side. The data store also is shown to include a mechanism for storing log data 1414, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1410. The data store 1410 is operable, through logic associated therewith, to receive instructions from the application server 1408 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1402. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
   a memory configured to store computer-executable instructions; and
   a processor configured to access the memory and execute the computer-executable instructions to at least:
     obtain historical navigation data and historical transaction data of a user;
     calculate, utilizing machine-learning techniques, user preference information indicating content in which the user may be interested, the user preference information being calculated based on the historical navigation data and the historical transaction data;
     obtain a plurality of edited content corresponding to a collection of motion pictures;
     determine a plurality of respective play durations for respective items of the plurality of edited content, at least one play duration of the plurality of respective play durations being determined based at least in part on the calculated user preference information;
     determine a plurality of respective start times for the respective items of the plurality of edited content; and
     play at least a subset of the plurality of edited content consecutively based at least in part on the plurality of respective start times and the plurality of respective play durations for the respective items of the collection of motion pictures.

2. The system of claim 1, wherein the historical transaction data comprises order history information for the user, and wherein the processor is further configured to execute the computer-executable instructions to at least:
   determine a genre category for individual motion pictures of the collection of motion pictures, the collection of motion pictures being related by a collection category; and wherein the plurality of respective play durations for the respective items are determined based at least in part on the order history information and the genre category for the individual motion pictures.

3. The system of claim 1, wherein the historical transaction data comprises order history information for the user, and wherein the processor is further configured to execute the computer-executable instructions to at least:
  determine a genre category for individual motion pictures of the collection of motion pictures;
  determine, utilizing machine-learning techniques and the order history information, a probability value indicating the likelihood that the user will order a specific motion picture associated with the genre category; and
  in response to determining that the probability value is greater than a threshold value, modify at least one play duration of the plurality of respective play durations.

4. The system of claim 1, wherein the processor is further configured to execute the computer-executable instructions to at least:
  receive user input indicating an interface selection to modify playback of the plurality of edited content;
  provide an interface for collecting information related to a reason for the modification; and
  store the collected information.

5. The system of claim 4, wherein the historical navigation data comprises information related to historical interface selections of the user, and wherein the historical interface selections are associated with the reason that the user decided to modify playback of previously-viewed edited content.

6. The system of claim 4, wherein the processor is further configured to execute the computer-executable instructions to at least:
  receive a user request for additional information related to a particular motion picture corresponding to edited content being played;
  suspend playback of the edited content being played while the additional information is presented; and
  present the additional information in response to the user request.

7. The system of claim 1, wherein the historical navigation data comprises information corresponding to interface selections by the user that resulted in modifying a start time of previously-viewed edited content, and wherein the processor is further configured to execute the computer-executable instructions to at least:
  determine, utilizing machine-learning techniques and the historical navigation data, a probability value indicating the likelihood that the user will select an option to modify a start time of edited content currently being played; and
  in response to determining that the probability value is greater than a threshold value, buffer a different portion of the edited content from a portion of the edited content being played.

8. The system of claim 1, wherein the plurality of respective play durations are determined based at least in part on a value that is user-configurable.

9. The system of claim 1, wherein the processor is further configured to execute the computer-executable instructions to at least:
  analyze particular edited content within a first threshold time period before or after a corresponding start time;
  determine, based at least in part on the analyzing of the particular edited content, a first production break in the particular edited content within the first threshold time period before or after the corresponding start time;
  modify the corresponding start time to a modified start time that corresponds to the first production break;
  analyze the particular edited content within a second threshold time period before or after an end time of the particular edited content, the end time being based at least in part on the corresponding start time and a particular play duration for the particular edited content;
  determine, based at least in part on the analyzing of the particular edited content, a second production break in the particular edited content within the second threshold time period before or after the end time; and
  modify the end time of the particular edited content to a modified end time that corresponds to the second production break, wherein the plurality of edited content is played based at least in part on the modified start time and the modified end time.

10. The system of claim 1, wherein the processor is further configured to execute the computer-executable instructions to at least:
  determine, from the historical transaction data, order history information associated with a user, the order history information indicating one or more purchases of the user; and
  determine, from the historical navigation data, navigational information associated with the user, the navigational information indicating one or more modifications to playback of previously-viewed edited content.

11. The system of claim 1, wherein the processor is further configured to execute the computer-executable instructions to at least:
  analyze individual edited content of the plurality of edited content within a threshold time period before or after a determined start time of the individual edited content;
  identify, based at least in part on the analyzing of the individual edited content, a production break within the individual edited content within the threshold time period before or after the determined start time; and
  modify the determined start time to a modified start time based at least in part on the production break.

12. A computer-implemented method, comprising:
  obtaining historical navigation data and historical transaction data of a user;
  calculating, utilizing machine-learning techniques, user preference information indicating content in which the user may be interested, the user preference information being calculated based on the historical navigation data and the historical transaction data;
  obtaining a plurality of edited content corresponding to a collection of motion pictures;
  determining a plurality of respective play durations for respective items of the plurality of edited content, at least one play duration of the plurality of respective play durations being determined based at least in part on the calculated user preference information;
  determining a plurality of respective start times for the respective items of the plurality of edited content; and
  playing at least a subset of the plurality of edited content consecutively based at least in part on the plurality of respective start times and the plurality of respective play durations for the respective items of the collection of motion pictures.

13. The computer-implemented method of claim 12, wherein the historical transaction data comprises order history information for the user and wherein the computer-implemented method further comprises:
  determining a genre category for individual motion pictures of the collection of motion pictures, the collection of motion pictures being related by a collection category, wherein the plurality of respective play durations for the respective items are determined based at least in part on the order history information and the genre category for the individual motion pictures.

14. The computer-implemented method of claim 12, wherein the historical transaction data comprises order history information for the user, and wherein the computer-implemented method further comprises:
  determining a genre category for individual motion pictures of the collection of motion pictures;
  determining, utilizing machine-learning techniques and the order history information, a probability value indicating the likelihood that the user will order a specific motion picture associated with the genre category; and
  in response to determining that the probability value is greater than a threshold value, modifying at least one play duration of the plurality of respective play durations.

15. The computer-implemented method of claim 12, further comprising:
  receiving user input indicating an interface selection to modify playback of the plurality of edited content;
  providing an interface for collecting information related to a reason for the modification; and
  storing the collected information.

16. The computer-implemented method of claim 15, wherein the historical navigation data comprises information related to historical interface selections of the user, and wherein the historical interface selections are associated with the reason that the user decided to modify playback of previously-viewed edited content.

17. The computer-implemented method of claim 15, further comprising:
  receiving a user request for additional information related to a particular motion picture corresponding to edited content being played;
  suspending playback of the edited content being played while the additional information is presented; and
  presenting the additional information in response to the user request.

18. The computer-implemented method of claim 12, wherein the historical navigation data comprises information corresponding to interface selections by the user that resulted in modifying a start time of previously-viewed edited content, and wherein the computer-implemented method further comprises:
  determining, utilizing machine-learning techniques and the historical navigation data, a probability value indicating the likelihood that the user will select an option to modify a start time of edited content currently being played; and
  in response to determining that the probability value is greater than a threshold value, buffering a different portion of the edited content from a portion of the edited content being played.

19. The computer-implemented method of claim 12, wherein the plurality of respective play durations are determined based at least in part on a value that is user-configurable.

20. The computer-implemented method of claim 12, further comprising:
  analyzing particular edited content within a first threshold time period before or after a corresponding start time;
  determining, based at least in part on the analyzing of the particular edited content, a first production break in the particular edited content within the first threshold time period before or after the corresponding start time;
  modifying the corresponding start time to a modified start time that corresponds to the first production break;
  analyzing the particular edited content within a second threshold time period before or after an end time of the particular edited content, the end time being based at least in part on the corresponding start time and a particular play duration for the particular edited content;
  determining, based at least in part on the analyzing of the particular edited content, a second production break in the particular edited content within the second threshold time period before or after the end time; and
  modifying the end time of the particular edited content to a modified end time that corresponds to the second production break, wherein the plurality of edited content is played based at least in part on the modified start time and the modified end time.

21. The computer-implemented method of claim 12, further comprising:
  determining, from the historical transaction data, order history information associated with a user, the order history information indicating one or more purchases of the user; and
  determining, from the historical navigation data, navigational information associated with the user, the navigational information indicating one or more modifications to playback of previously-viewed edited content.

22. The computer-implemented method of claim 12, further comprising:
  analyzing individual edited content of the plurality of edited content within a threshold time period before or after a determined start time of the individual edited;
  identifying, based at least in part on the analyzing of the individual edited content, a production break within the individual edited content within the threshold time period before or after the determined start time; and
  modifying the determined start time to a modified start time based at least in part on the determined production break.

23. A non-transitory computer-readable medium having stored thereon computer-executable instructions that, when executed by at least one processor, cause at least one computer to perform instructions comprising:
  obtaining historical navigation data and historical transaction data of a user;
  calculating, utilizing machine-learning techniques, user preference information indicating content in which the user may be interested, the user preference information being calculated based on the historical navigation data and historical transaction data;
  obtaining a plurality of edited content corresponding to a collection of motion pictures;
  determining a plurality of respective play durations for respective items of the plurality of edited content, at least one play duration of the plurality of respective play durations being determined based at least in part on the calculated user preference information;
  determining a plurality of respective start times for the respective items of the plurality of edited content; and
  playing at least a subset of the plurality of edited content consecutively based at least in part on the plurality of respective start times and the plurality of respective play durations for the respective items of the collection of motion pictures.

24. The non-transitory computer-readable medium of claim 23, wherein the historical transaction data comprises order history information for the user, and wherein the at least one computer is caused to perform further instructions comprising:
  determining a genre category for individual motion pictures of the collection of motion pictures, the collection of motion pictures being related by a collection category, wherein the plurality of respective play durations for the respective items are determined based at least in part on the order history information and the genre category for the individual motion pictures.

25. The non-transitory computer-readable medium of claim 23, wherein the historical transaction data comprises order history information for the user, and wherein the at least one computer is caused to perform further instructions comprising:
  determining a genre category for individual motion pictures of the collection of motion pictures;
  determining, utilizing machine learning-techniques and the order history information, a probability value indicating the likelihood that the user will order a specific motion picture associated with the genre category; and
  in response to determining that the probability value is greater than a threshold value, modifying at least one play duration of the plurality of respective play durations.

26. The non-transitory computer-readable medium of claim 23, wherein the at least one computer is caused to perform further instructions comprising:
  receiving user input indicating an interface selection to modify playback of the plurality of edited content;
  providing an interface for collecting information related to a reason for the modification; and
  storing the collected information.

27. The non-transitory computer-readable medium of claim 26, wherein the historical navigation data comprises information related to historical interface selections of the user, and wherein the historical interface selections are associated with the reason that the user decided to modify playback of previously-viewed edited content.

28. The non-transitory computer-readable medium of claim 26, wherein the at least one computer is caused to perform further instructions comprising:
  receiving a user request for additional information related to a particular motion picture corresponding to edited content being played;
  suspending playback of the edited content being played while the additional information is presented; and
  presenting the additional information in response to the user request.

29. The non-transitory computer-readable medium of claim 23, wherein the historical navigation data comprises information corresponding to interface selections by the user that resulted in modifying a start time of previously-viewed edited content, and wherein the at least one computer is caused to perform further instructions comprising:
  determining, utilizing machine-learning techniques and the historical navigation data, a probability value indicating the likelihood that the user will select an option to modify a start time of edited content currently being played; and
  in response to determining that the probability value is greater than a threshold value, buffering a different portion of the edited content from a portion of the edited content being played.

30. The non-transitory computer-readable medium of claim 23, wherein the plurality of play durations are determined based at least in part on a value that is user configurable.

31. The non-transitory computer-readable medium of claim 23, wherein the at least one computer is caused to perform further instructions comprising:
  analyzing particular edited content within a first threshold time period before or after a corresponding start time;
  determining, based at least in part on the analyzing of the particular edited content, a first production break in the particular edited content within the first threshold time period before or after the corresponding start time;
  modifying the corresponding start time to a modified start time that corresponds to the determined first production break;
  analyzing the particular edited content within a second threshold time period before or after an end time of the particular edited content, the end time being based at least in part on the corresponding start time and a particular play duration for the particular edited content;
  determining, based at least in part on the analyzing of the particular edited content, a second production break in the particular edited content within the second threshold time period before or after the end time; and
  modifying the end time of the particular edited content to a modified end time that corresponds to the second production break, wherein the plurality of edited content is played based at least in part on the modified start time and the modified end time.

32. The non-transitory computer-readable medium of claim 23, wherein the at least one computer is caused to perform further instructions comprising:
  determining, from the historical transaction data, order history information associated with a user, the order history information indicating one or more purchases of the user; and
  determining, from the historical navigation data, navigational information associated with the user, the navigational information indicating one or more modifications to playback of previously-viewed edited content.

33. The non-transitory computer-readable medium of claim 23, wherein the at least one computer is caused to perform further instructions comprising:
  analyzing individual edited content of the plurality of edited content within a threshold time period before or after a determined start time of the individual edited;
  identifying, based at least in part on the analyzing of the individual edited content, a production break within the individual edited content within the threshold time period before or after the determined start time; and
  modifying the determined start time to a modified start time based at least in part on the determined production break.

\* \* \* \* \*